United States Patent
Patterson

(10) Patent No.: US 12,213,410 B2
(45) Date of Patent: Feb. 4, 2025

(54) APPARATUS AND METHOD FOR PROCESSING ROUGHAGES

(71) Applicant: R. C. Patterson, Kim, CO (US)

(72) Inventor: R. C. Patterson, Kim, CO (US)

( * ) Notice: Subject to any disclaimer, the term of this patent is extended or adjusted under 35 U.S.C. 154(b) by 116 days.

(21) Appl. No.: 17/489,567

(22) Filed: Sep. 29, 2021

(65) Prior Publication Data
US 2022/0015295 A1    Jan. 20, 2022

Related U.S. Application Data

(63) Continuation-in-part of application No. 16/432,687, filed on Jun. 5, 2019.
(Continued)

(51) Int. Cl.
*A01F 29/00* (2006.01)
*A01D 41/127* (2006.01)
(Continued)

(52) U.S. Cl.
CPC ........... *A01D 69/03* (2013.01); *A01D 41/127* (2013.01); *A01D 57/06* (2013.01); *A01F 29/005* (2013.01);
(Continued)

(58) Field of Classification Search
CPC .... Y10S 241/605; A01F 29/00; A01F 29/005; A01F 29/14; A01K 5/001; A01K 5/002; A01K 5/005
(Continued)

(56) References Cited

U.S. PATENT DOCUMENTS 2,221,266 A    11/1940    Roach
2,685,900 A    8/1954    Cross
(Continued)

FOREIGN PATENT DOCUMENTS

EP    0551044 A1 *    7/1993    ............. A01F 29/00
FR    2972602 A1 *    9/2012    ........... A01F 29/005

OTHER PUBLICATIONS

Shain D., et al., "Roughage Source and Particle Size in Finishing Diet," Nebraska Beef Cattle Reports, 1996, 3 pages.

*Primary Examiner* — Jared O Brown
(74) *Attorney, Agent, or Firm* — Messner Reeves LLP

(57) ABSTRACT

An apparatus for roughage processing includes a first platform for placing of a first type of roughage, a first cutting mechanism for processing the first type of roughage, a first chain for moving the first type of roughage from the first platform to the first cutting mechanism; and a second platform, a second cutting mechanism, and a second chain for performing similar tasks with a second type of roughage. The first chain and the first cutting mechanism and the second chain are driven at a different speed to provide concurrent cutting of the first and second types of roughages at different cut sizes. The apparatus further includes a conveyor an auger for concurrently collecting the first type of roughage and the second type of roughage after respective processing by the first cutting mechanism and the second cutting mechanism for effective blending of the two types of roughages, each of which has been cut differently to obtain its optimum particle size for ruminant consumption. The apparatus can be powered by a very small horse power motor. It also includes a mechanism that will stop the floor chains carrying the roughage into the knife drums when the power load force that is detected by the knife drum power load reading device reaches a predetermined amount. This (Continued)

predetermined amount is still within, but near the upper limits of, the available horsepower range of the small motor powering it.

33 Claims, 14 Drawing Sheets

Related U.S. Application Data

(60) Provisional application No. 63/084,985, filed on Sep. 29, 2020, provisional application No. 62/682,006, filed on Jun. 7, 2018.

(51) Int. Cl.
*A01D 57/06* (2006.01)
*A01D 69/03* (2006.01)
*A01F 29/14* (2006.01)
*A01K 5/00* (2006.01)
*A23K 40/00* (2016.01)

(52) U.S. Cl.
CPC .............. *A01F 29/14* (2013.01); *A01K 5/005* (2013.01); *A23K 40/00* (2016.05); *Y10S 241/605* (2013.01)

(58) Field of Classification Search
USPC .......................................... 241/605
See application file for complete search history.

(56) References Cited

U.S. PATENT DOCUMENTS

| | | | |
|---|---|---|---|
| 2,941,505 A | 6/1960 | Middlen | |
| 3,035,729 A | 5/1962 | Soares et al. | |
| 3,168,291 A | 2/1965 | Knoedler et al. | |
| 3,184,108 A | 5/1965 | Grau | |
| 3,254,878 A | 6/1966 | Lorenzen | |
| 3,265,227 A | 8/1966 | Vratil et al. | |
| 3,379,417 A | 4/1968 | Luscombe | |
| 3,863,850 A | 2/1975 | Freeman | |
| 3,897,018 A | 7/1975 | Wilkes et al. | |
| 3,926,378 A | 12/1975 | Ryan | |
| 3,999,674 A | 12/1976 | Meitl | |
| 3,999,675 A | 12/1976 | Forry et al. | |
| 4,092,004 A | 5/1978 | Leverenz et al. | |
| 4,101,081 A | 7/1978 | Ritter et al. | |
| 4,376,515 A | 3/1983 | Soe | |
| 4,428,537 A | 1/1984 | Von Der Heide | |
| 4,561,781 A | 12/1985 | Seymour | |
| 4,577,805 A | 3/1986 | Seymour | |
| 4,688,729 A | 8/1987 | Hobson, Sr. | |
| 4,896,442 A * | 1/1990 | Stiff | E02F 9/2239 180/242 |
| 4,907,538 A | 3/1990 | Helmle et al. | |
| 5,209,413 A | 5/1993 | Dwyer et al. | |
| 5,505,391 A | 4/1996 | Krueger et al. | |
| 5,573,190 A | 11/1996 | Goossen | |
| 5,626,298 A | 5/1997 | Arnoldy | |
| 5,718,188 A | 2/1998 | Erickson | |
| 5,813,616 A | 9/1998 | Vandervalk | |
| 6,086,001 A | 7/2000 | Patterson | |
| 6,199,781 B1 | 3/2001 | Hruska | |
| 6,467,710 B1 | 10/2002 | Patterson | |
| 6,910,649 B2 * | 6/2005 | Patterson | A01K 5/005 241/101.6 |
| 7,025,556 B1 | 4/2006 | Koffman et al. | |
| 2007/0290087 A1 * | 12/2007 | Weiss | A01F 29/005 241/101.76 |
| 2010/0155513 A1 * | 6/2010 | Brick | A01F 29/005 241/186.3 |
| 2023/0191581 A1 * | 6/2023 | Ballard | B25F 5/005 173/1 |

* cited by examiner

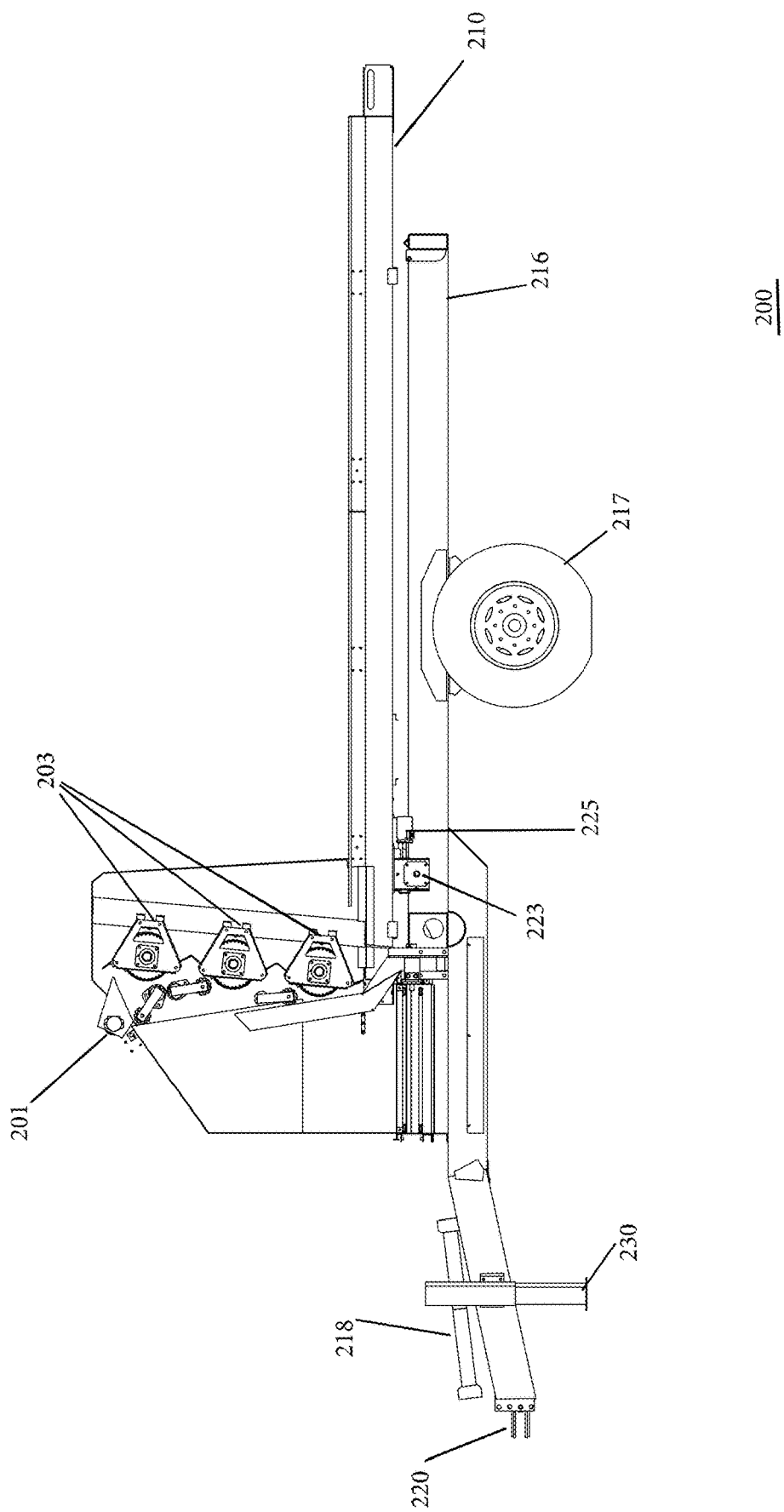

APPARATUS AND METHOD FOR PROCESSING ROUGHAGES

CROSS REFERENCE TO RELATED APPLICATIONS

The present application is continuation-in-part of U.S. application Ser. No. 16/432,687 filed on Jun. 5, 2019, which claims the benefits of and priority, under 35 U.S.C. § 119(e), to U.S. Provisional Application Ser. No. 62/682,006, filed Jun. 7, 2018, and this application claims the benefits of and priority, under 35 U.S.C. § 119(e), to U.S. Provisional Application Ser. No. 63/084,985, filed Sep. 29, 2020, each of which is fully incorporated herein by reference as if fully set forth herein.

BACKGROUND OF THE INVENTION

Field of the Invention

The present invention generally relates to processing roughages, and more particularly to an apparatus and method for cutting, chopping, and processing varying roughages.

Description of the Related Art

When feeding livestock, there are some basic fundamentals that should be met to promote the livestock's survival first and foremost as well as its growth, development, and well-being. For example, we should meet the particular class of livestock's minimum dry matter intake needs. We should also meet both their protein and energy needs, and the feed sources should also be in the proper particle size.

The particle size of the feed is a key component of the nutritional needs. Incorrect roughage feed source particle size, either too large or too small, would decrease the efficiency of the feed source. Chopping or cutting roughage feed sources is an important component to control the particle size.

There are deficiencies in the related art. Large portable tub grinders, choppers, and cutters, as well as large stationary grinders and choppers in the related art can sometimes be utilized to cut, chop, or process each individual roughage to efficient particle size if the roughages are each run through it individually. However, the roughages would need to be stored individually, then later blended with mixer trucks or ration blending stations. This is customarily how roughages are chopped or cut and blended into rations in a large feed lot situation. This, however, requires several very expensive pieces of equipment as well as a lot of time and labor. There is also usually quite a bit of feed loss in all the chopping, cutting, moving, storing, loading, blending, and/or dispensing stages that are involved in actually feeding the livestock. The labor and equipment needed for this process make it unfeasible for many smaller family ranching and livestock operations.

SUMMARY OF THE INVENTION

Accordingly, embodiments of the invention are directed to an apparatus and method for cutting, chopping, and processing varying roughages that substantially obviate one or more of the problems due to limitations and disadvantages of the related art.

An advantage of an embodiment is to provide chopping, cutting, and/or processing different roughages, with different consistencies, to a more desirable particle size for livestock consumption, to create an efficient ration and deliver it to livestock.

Yet another advantage of an embodiment is to power the apparatus with a small horsepower motor in order to allow for a less expensive solution and mobile solution that can be on a trailer.

Additional features and advantages of the invention set forth in the description which follows and in the art will be apparent from the description, or may be learned by practice of the invention. The objectives and other advantages of the invention will be realized and attained by the structure particularly pointed out in the written description and claims hereof as well as the appended figures.

In an embodiment, a roughage processing apparatus comprises a first platform for placing of a first type of roughage; a first cutting mechanism for processing the first type of roughage; a first chain for moving the first type of roughage from the first platform to the first cutting mechanism; a second platform for placing of a second type of roughage; a second cutting mechanism for processing the second type of roughage; a second chain for moving the second type of roughage from the second platform to the second cutting mechanism; and a conveyor for concurrently collecting the first type of roughage and the second type of roughage after respective processing by the first cutting mechanism and the second cutting mechanism, wherein a speed of the first chain is different from a speed of the second chain. The roughage processing apparatus further comprises a trailer for hosting the first platform and the second platform. The roughage processing apparatus further comprises a truck, the truck includes a truck bed for hosting the first platform and the second platform and a truck head. The first cutting mechanism comprises sharp edges disposed on one or more drums. The conveyor is configured to move a mixture of the first type of roughage and the second type of roughage after processing away from the roughage processing apparatus. The roughage processing apparatus further comprises one or more weight scales on the first platform for measuring a weight of the first roughage. The first cutting mechanism is supported by the first platform. The roughage processing apparatus further comprises computational equipment for adjusting the speed of the first chain.

In another embodiment, a roughage processing apparatus comprises a first platform for placing of a first type of roughage; a first cutting mechanism for processing the first type of roughage; a first chain for moving the first type of roughage from the first platform to the first cutting mechanism; a second platform for placing of a second type of roughage; a second cutting mechanism for processing the second type of roughage; a second chain for moving the second type of roughage from the second platform to the second cutting mechanism; and one or more wheels for moving the roughage processing apparatus, wherein a speed of the first chain is different from a speed of the second chain. The roughage processing apparatus further comprises a conveyor for concurrently collecting the first type of roughage and the second type of roughage after respective processing by the first cutting mechanism and the second cutting mechanism. The first cutting mechanism comprises sharp edges disposed on one or more drums. The roughage processing apparatus further comprises one or more weight scales on the first platform for measuring a weight of the first roughage. The first cutting mechanism is supported by the first platform. The roughage processing apparatus further comprises computational equipment for adjusting the speed of the first chain. The roughage processing apparatus further comprises a trailer for hosting the first platform and the second platform. The trailer comprises at least one of the following: wirings, hoses, or chains and sprockets for powering the first cutting mechanism and another of the same for powering the second cutting mechanism.

In a further embodiment, a method of processing roughage comprises first placing a first type of roughage on a first platform; first moving the first type of roughage from the first platform to a first cutting mechanism; first processing the first type of roughage by the first cutting mechanism; second placing a second type of roughage on a second platform; second moving the second type of roughage from the second platform to a second cutting mechanism; second processing the second type of roughage by the second cutting mechanism; and collecting a mixture of first type of roughage and the second type of roughage after the respective processings by a conveyor, wherein a speed of the first moving is different from a speed of the second moving, and wherein a speed of the first cutting mechanism is different from the speed of the second cutting mechanism. The first cutting mechanism comprises sharp edges disposed on one or more drums. The method further comprises adjusting the speed of the first moving by computational equipment. The method of further comprises weighing a weight of the first type of roughage on the first platform. The method further comprises weighing a weight of the second type of roughage on the second platform.

In one embodiment, a roughage processing apparatus includes a motor having a horsepower below about 50 horsepower, one or more cutting mechanisms configured to process the one more types of roughage, wherein the one or more cutting mechanisms is powered with a hydraulic motor and the hydraulic motor is configured to operate in a predetermined hydraulic pressure range. The apparatus also includes a first platform configured to receive one or more types of roughage, a first chain configured to move the one more types of roughage to the one or more cutting mechanisms and powered by a first chain hydraulic motor, a second platform configured to receive the one or more types of roughage, a second chain configured to move the one more types of roughage to the one or more cutting mechanisms and powered by a second chain hydraulic motor and one or more sensors for sensing the hydraulic pressure range of the hydraulic motor. The apparatus also includes a controller for controlling the hydraulic pressure to the hydraulic motor, the first chain hydraulic motor and the second chain hydraulic motor, the controller is configured to stop or reduce a power to the first chain hydraulic motor and the second chain hydraulic motor when the sensed pressure exceeds a predetermined pressure and a conveyor for concurrently collecting the first type of roughage and the second type of roughage after respective processing by the one or more cutting mechanisms.

In one embodiment, a method of processing roughage includes arranging a first type of roughage on a first platform, arranging a second type of roughage on a second platform, moving the first type of roughage from the first platform to one more cutting mechanisms at a first speed, and moving the second type of roughage from the second platform to one more cutting mechanisms at a second speed. The method also includes controlling the first speed and the second speed, with computational equipment, based on one more inputs indicative of one or more of: i) a predetermined mixing ratio, ii) a speed of the one or more cutting mechanisms, iii) a predetermined hydraulic pressure of a hydraulic pressure configured to operate a hydraulic motor configured to power the one more cutting mechanisms, iv) a hydraulic pressure configured to operate a hydraulic motor configured to power a chain or conveyor assembly on the first platform, v) a hydraulic pressure configured to operate a hydraulic motor configured to power a chain or conveyor assembly on the second platform, vi) a time feature of any of i) through v). In a preferred embodiment the predetermined pressure includes a pressure of greater than 1800 psi or a pressure below 1600 psi.

It is to be understood that both the foregoing general description and the following detailed description are exemplary and explanatory and are intended to provide further explanation of the invention as claimed.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

BRIEF DESCRIPTION OF THE FIGURES

The accompanying figures, which are included to provide a further understanding of the invention, are incorporated in and constitute a part of this specification and illustrate embodiments of the invention and together with the description serve to explain the principles of the invention.

FIGS. 2A-2D illustrate views of an exemplary apparatus for roughage processing according to an embodiment.

DETAILED DESCRIPTION

Figure 1A:
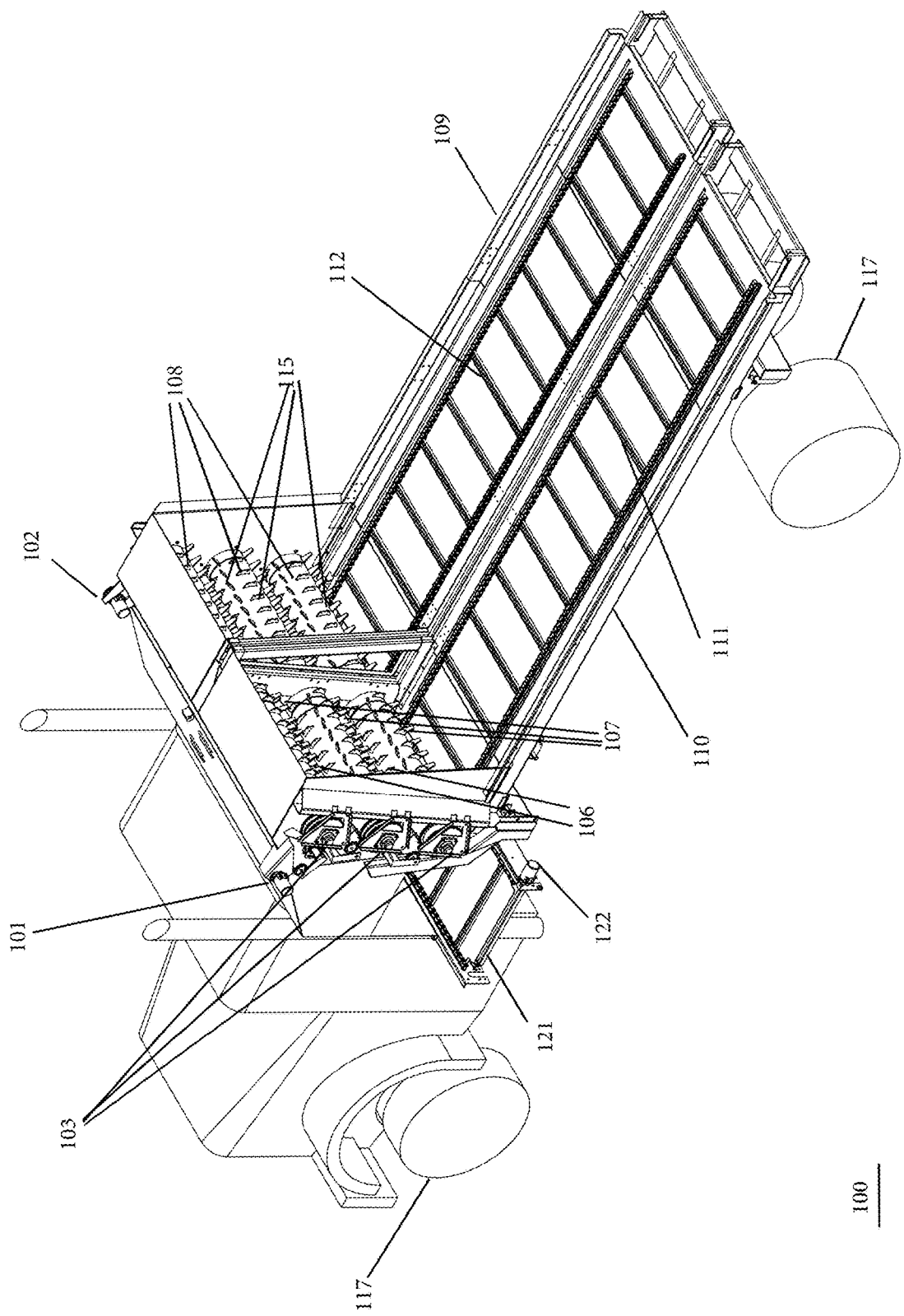
FIGS. 1A-1D illustrate views of an exemplary apparatus for roughage processing according to an embodiment.

Chopping and/or cutting roughage feed sources are important components to control the particle size. The chop or cut is a key component, because not only does it increase or decrease the efficiency of the roughage feed sources, it is also virtually impossible to meet all of the nutritional needs of livestock without the ability to blend feed sources. With a roughage feed source, it is generally required to cut or chop the feed source in order to blend it.

There is equipment that cuts, chops, or processes the roughages, so each roughage is in the particle size that can be blended together and create rations to meet livestock nutritional needs. For example, there are roughage grinders, cutters, choppers, and processors which are designed to cut, chop, or process roughage and try to obtain the correct particle size when feeding roughages. However, they do not allow for the blending of roughages, and they do not provide producers the ability to blend roughages to create cost-efficient rations without involving more time, labor and equipment to actually blend the roughages and other feed sources and to dispense the ration to the livestock.

Total Mix Ration (TMR) apparatuses are designed to blend large amounts of concentrate and/or silage while simultaneously chopping and/or cutting, and blending it with small amounts of a single type of roughage to create a cost-efficient balanced ration for dispensing to the livestock as well. The TMR apparatus eliminates many steps and pieces of equipment. They are sometimes used to blend different types of roughage, because there is not another option. However, they do not blend two different types of roughage very well, since virtually every different class of roughage requires a different amount of chopping, cutting, or processing to reach its optimum particle size. The TMR mixer does not have the ability to chop or cut each roughage feed source individually to obtain its optimum particle size, so there is a lot of efficiency lost from one, if not both, of the roughage feed sources when TMR mixers are utilized. The TMR mixers not only lack the ability to chop, cut, or process each roughage to its individual optimum particle size, it also does not blend two roughages very well.

TMRs also require a lot of time to set up to cut, chop, and blend the feed sources before the ration can be fed. Another problem with TMRs is that once the ration has been created and is being dispensed to a certain class of livestock, it cannot be changed on the go to feed different cuts, chops, or blends to different classes of livestock. The different classes of livestock have different nutritional requirements and different particle size requirements, such as younger livestock versus older or sheep versus cattle, requiring users of the TMRs to stop and reset the TMRs for the now required cut, chop or blend.

In order to more fully appreciate the present disclosure and to provide additional related features, each of the following references are incorporated therein by reference in their entireties and specifically for each of the teachings as follows:

(a) U.S. Pat. No. 6,086,001 to Patterson, herein incorporated by reference, discloses a machine adapted to be towed by a tractor and powered by the PTO and hydraulic power system of the tractor for transporting, processing and blending two different types of roughage of substantial size and weight into a desired ratio for a more efficient and economical nutritional balance and better palatability as well as dispensing the ratio to livestock. This improved machine is characterized by two independently hydraulically driven floor chains that are each capable of carrying a large bale (or bales) of roughage through a series of vertically aligned shredders at different rates of speed. This produces a blend of differing types of roughage consistent with the desired nutritional component considered most economical and efficient for the particular livestock being fed. The processed ration is dropped onto a conveyor chain and immediately delivered into feed bunks for livestock consumption. The shredders and conveyor chain are mechanically driven. The variable speed of one hydraulically driven floor chain is controlled by a flow control divertor, while the speed of the other hydraulically driven floor chain remains constant.

(b) U.S. Pat. No. 6,467,710 to Patterson, herein incorporated by reference, discloses a roughage processing and dispensing apparatus including a mobile frame defining a floor section for supporting a plurality of bales of roughage, a shredder section in which the bales are shredded, a discharge section for discharging roughage shredded in said shredder section and a bin for particulate feed material; a shredder disposed in the shredder section; a first conveyor for moving at least one of the bales into the shredder means at a given speed; and a conveyor system arranged to receive from the shredder the shredded content of the one bale, and to transport the content to the discharge section. Also included is an auxiliary conveyor for moving the feed material to the discharge section at a selected rate; a drive mechanism operable to provide simultaneous movement of the first conveyor, the auxiliary conveyor and the conveyor system; and a control system for varying the given speed relative to the selected rate.

(c) U.S. Pat. No. 6,910,649 to Patterson, herein incorporated by reference, discloses a mobile apparatus for combining and dispensing different livestock feeds including roughage, particulate matter and liquids. A control system provides and weighs selected ratios of combined feed sources to establish a desired ration.

In one embodiment, the means of blending roughages in varying degrees, thus giving the producer the ability to create cost-efficient roughage-based rations and even allowed for changing the blend on the go while processing, dispensing, and delivering the ration to the livestock can be set forth as described with U.S. Pat. No. 6,086,001, which is herein incorporated by references in its entirety.

In one embodiment, concentrate in varying amounts can be added to the roughage and feed, further enhancing a producer's ability to blend and create cost-efficient rations while delivering it to the livestock by allowing for a third feed source as described in U.S. Pat. No. 6,467,710, which is herein incorporated by references in its entirety.

In one embodiment, the a weighing technique for each feed source and the amount being blended in individually can be utilized as described in U.S. Pat. No. 6,910,649, which is herein incorporated by references in its entirety. This ability to weigh and know the amount of each feed source being blended in with more precision further enhanced the ability to create cost-efficient, balanced feed rations to meet the livestock's national requirements.

In one embodiment, when processing different roughages, there is a significant benefit to increase the efficiency or utilization of the roughage feed source by chopping, cutting, or processing it to the optimum particle size for the class of livestock being fed. Different roughages may need different amounts of chopping, cutting, or processing to reach their preferred particle size. When the roughage is in the proper or optimum particle size for the class of livestock being fed, it may reduce the tonnage needed by up to, e.g., 30% or, in other words, increase the efficiency by up to, e.g., 30%. Additional advantages regarding roughage source and particle size in finishing diet is disclosed in Shain, Drew et al., "Roughage Source and Particle Size in Finishing Diet" (1996). Nebraska Beef Cattle Reports. 490, which is herein incorporated by reference.

In one embodiment, the apparatus is portable and operated with a small horse power motor and configured to chop, cut, or process different roughages to different particle sizes at the same time. The roughages can be cut, chopped, or processed individually in varying amounts and then blended together.

In one embodiment, the apparatus is configured for chopping, cutting, or processing of the different types of roughages being utilized, thus allowing the producer or operator the ability to cut, chop, or process each different roughage feed source to its optimum particle size for maximum efficiency for the class of livestock being fed.

In one embodiment, a roughage processing apparatus may consist of two separate sets of cutters, choppers, beater bars, drums with knives or flails, and/or other mechanism that provide for cutting, chopping, and/or processing roughage. These two independent sets of cutting, chopping, or processing devices may be independently controlled so as to give the producer the ability to run one set at an increased or decreased rate, speed, or velocity, in relation to the other set. This allows the producer to cut, chop, or process one type of roughage more when it requires more cutting, chopping or processing to reach its preferred particle size, in relation to another type of roughage which may need less cutting, chopping, or processing to reach preferred particle size. When the operator has the ability to vary the cut, chop or process on each roughage individually and obtain the optimum particle size on each roughage, simultaneously, the feed efficiency of both roughages can be significantly increased.

In one embodiment, the apparatus is configured to chop, cut, mix and process, roughages on a portable trailer and is a powered with a small horsepower motor, e.g., 50 horsepower or less. In a preferred embodiment, the motor has a horsepower in a range from about 30 horsepower to about 25 horsepower or less. The ability to power this apparatus with a small horsepower motor is less expensive for the producer to purchase and configured to be easily towed around for feed dispersal by a pickup or other small vehicles requiring no additional power form said vehicle to actually chop and or blend and dispense the roughages.

One embodiment is directed towards an apparatus including a knife drum power load reading device that is able to detect the amount of power load force being applied to the knife drums to turn them. The apparatus also includes a mechanism that will stop the floor chains carrying the roughage into the knife drums when the power load force that is detected by the knife drum power load reading device reaches a predetermined amount. This predetermined amount is still within, but near the upper limits of, the available horsepower range of the small motor powering it. The predetermined power load point is configured to allow continued turning of the knife drums at that power load point, and allowing it to power through tougher spots in the roughage being chopped. The apparatus also includes a mechanism that restarts the floor chains carrying the roughage into the knife drums when the load force that is detected by the knife drum power load reading device reaches a predetermined lower point.

In a preferred embodiment, when the floors moving the roughage into the knife drums are stopped, it eliminates and/or reduces any additional force being put on the knife drums and since the floors were stopped when the knife drums were still turning, they are able to continue chopping the roughage and as it is chopped more and more the existing force on the knife drums becomes less and less. With less force being exerted on the knife drums they will quickly regain speed, power, and torque and are then able to continue chopping the roughage. With an additional mechanism that restarts the floor chains carrying the roughage into the knife drums when the load force that is detected by the knife drum power load reading device reaches a predetermined lower point, this invention is able to power through the tough spots in the roughages without requiring more horsepower to do so.

In one embodiment, a self-powered apparatus and method for cutting, chopping, or processing of roughages that utilizes a smallhorse power motor for power. The ability to do this with a small horsepower motor allows for considerably more efficient machinery and lower fuel costs, and being self-powered also allows for more efficient options for towing vehicles.

In one embodiment, a method of using the apparatus allows the use of a small horsepower motor to chop, cut, or process different roughages to a more desirable particle size to create an efficient ration for livestock consumption.

In one embodiment, the apparatus is configured to chop the roughage feed sources and configured to be used to blend and create a ration for livestock with a small power source, e.g., small horsepower motor. When creating rations for livestock feeding, it is virtually always necessary to be able to blend feed sources in varying amounts to meet the livestock's nutritional requirements and it is always beneficial to have the feed sources in the optimum particle size for the livestock being fed. Not having the feed sources in the proper particle size can increase the amount that has to be fed by as much as about thirty percent (30%). When this process can be done with a small horsepower motor, the apparatus can be produced and sold for less money and it will use less fuel to do the same amount of work also increasing efficiency. Moreover, the apparatus is portable and can be transparent with conventional vehicles, e.g., conventional pickups, rather than tractors or larger equipment.

In one embodiment, the operator or producer has the ability to chop, cut, or process roughage to a more optimum particle size for the type of livestock being fed with a very small horsepower motor, e.g., electric motor, gas motor or hybrid motor. In this embodiment, additional power from the vehicle or mechanism towing it or the vehicle or mechanism it is mounted on is not required. Moreover, the apparatus can be readily maneuvered into an area to dispense the processed roughage to the livestock as it can be towed by a small conventional pickup truck or many other small vehicle types, thereby further decreasing cost and increasing efficiency for the producer or operator.

In one embodiment, a roughage processing apparatus includes a motor having a horsepower below about 50 horsepower, one or more cutting mechanisms configured to process the one more types of roughage, wherein the one or more cutting mechanisms is powered with a hydraulic motor and the hydraulic motor is configured to operate in a predetermined hydraulic pressure range. The apparatus also includes a first platform configured to receive one or more types of roughage, a first chain configured to move the one more types of roughage to the one or more cutting mechanisms and powered by a first chain hydraulic motor, a second platform configured to receive the one or more types of roughage, a second chain configured to move the one more types of roughage to the one or more cutting mechanisms and powered by a second chain hydraulic motor and one or more sensors for sensing the hydraulic pressure range of the hydraulic motor. The apparatus also includes a controller for controlling the hydraulic pressure to the hydraulic motor, the first chain hydraulic motor and the second chain hydraulic motor, the controller is configured to stop or reduce a power to the first chain hydraulic motor and the second chain hydraulic motor when the sensed pressure exceeds a predetermined pressure and a conveyor for concurrently collecting the first type of roughage and the second type of roughage after respective processing by the one or more cutting mechanisms.

In one embodiment, a method of processing roughage includes arranging a first type of roughage on a first platform, arranging a second type of roughage on a second platform, moving the first type of roughage from the first platform to one more cutting mechanisms at a first speed, and moving the second type of roughage from the second platform to one more cutting mechanisms at a second speed. The method also includes controlling the first speed and the second speed, with computational equipment, based on one more inputs indicative of one or more of: i) a predetermined mixing ratio, ii) a speed of the one or more cutting mechanisms, iii) a predetermined hydraulic pressure of a hydraulic pressure configured to operate a hydraulic motor configured to power the one more cutting mechanisms, iv) a hydraulic pressure configured to operate a hydraulic motor configured to power a chain or conveyor assembly on the first platform, v) a hydraulic pressure configured to operate a hydraulic motor configured to power a chain or conveyor assembly on the second platform, vi) a time feature of any of i) through v). In a preferred embodiment the predetermined pressure includes a pressure of greater than 1800 psi or a pressure below 1600 psi.

Reference will now be made in additional detail to an embodiment of the present invention, example of which is illustrated in the accompanying figures.

Figure 1B:
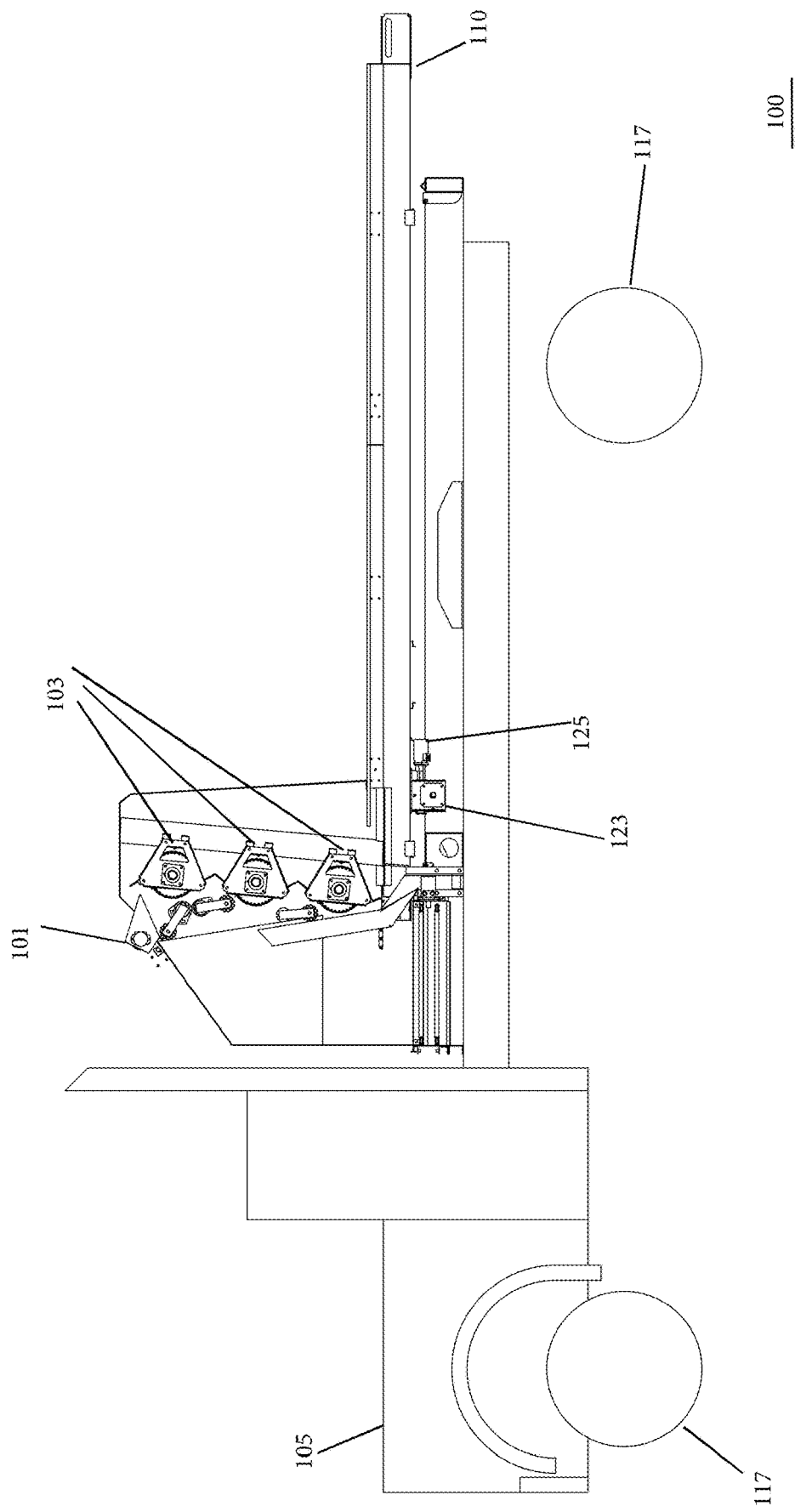
Figure 1C:
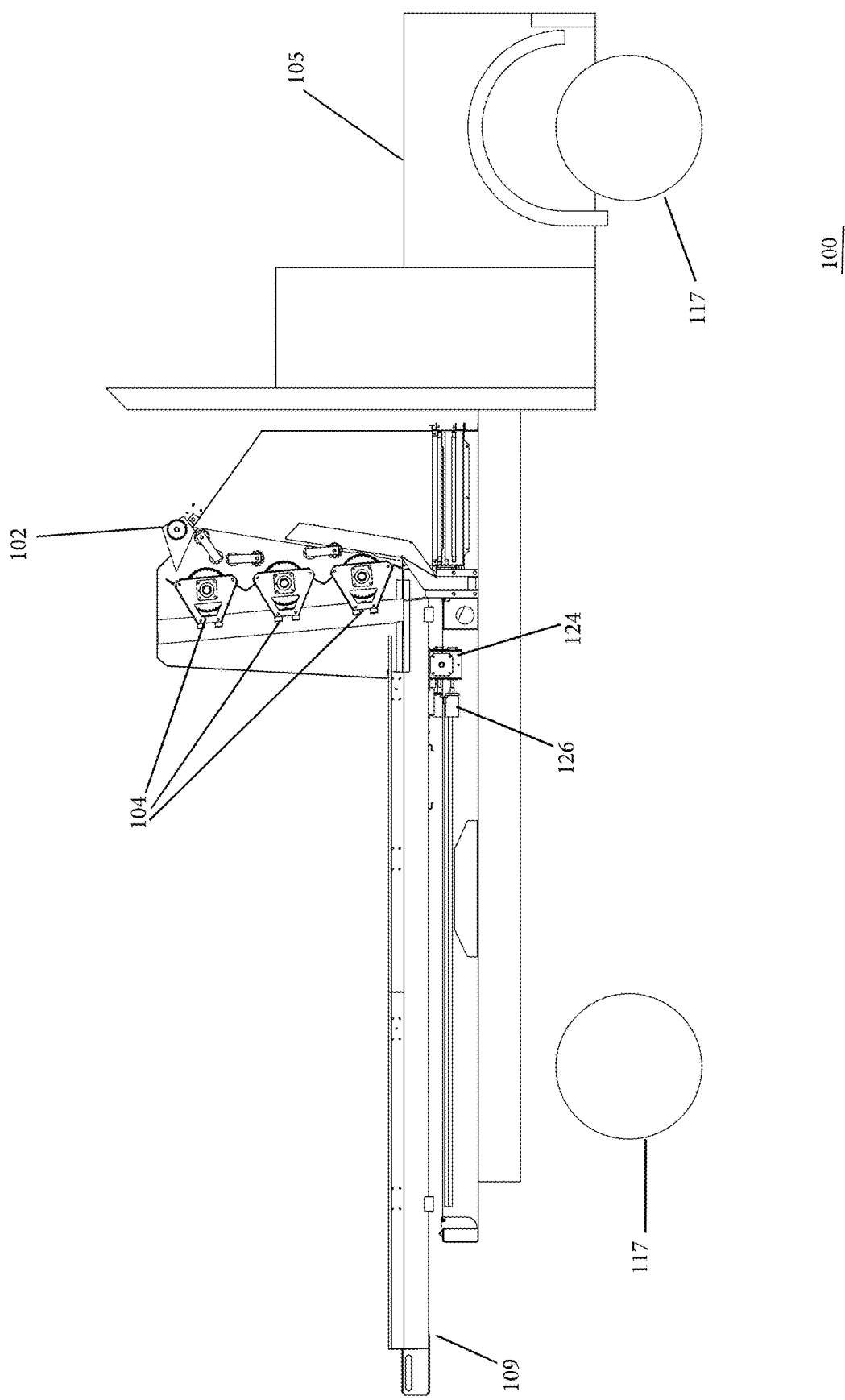
Figure 1D:
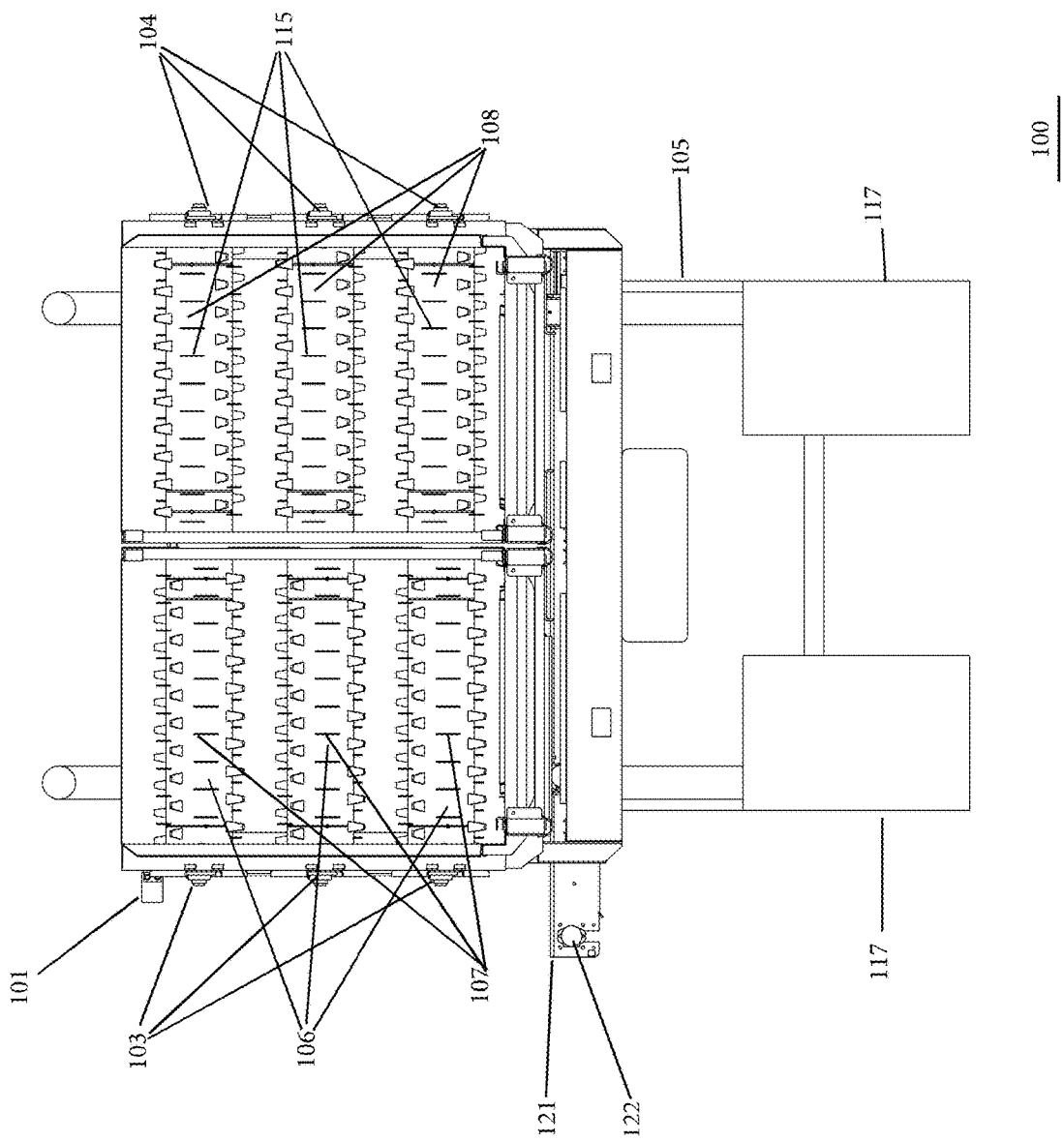

FIGS. 1A-1D illustrate views of an exemplary apparatus for roughage processing according to an embodiment; FIG. 1A illustrates a perspective view of the apparatus; FIG. 1B illustrates a left side view of the apparatus; FIG. 1C illustrates a right side view of the apparatus; and FIG. 1D illustrates a back view of the apparatus.

Referring to FIGS. 1A-1D, roughage processing apparatus 100 may be mounted on a frame or bed of a truck 105 and/or other vehicles according to an embodiment.

In an embodiment, roughage processing apparatus 100 may include a truck or other motorized portion 105, wheels 117, left platform 110, right platform 109, left chains or conveyor 111, right chains or conveyor 112, left driving mechanisms 101 and 103, right driving mechanisms 102 and 104, left drums 106, right drums 108, left cutting mechanisms 107, right cutting mechanisms 115, left platform gearbox 123, right platform gearbox 124, left platform motor 125, right platform motor 126, discharge conveyor 121, and discharge conveyor motor 122.

In an embodiment, roughages of different types (e.g., two different types of roughages) may be processed by the two sides of roughage processing apparatus 100. For example, roughage of one type (e.g., roughage type A) may be processed by the left side of the roughage processing apparatus 100, and roughage of another type (e.g., roughage type B) may be processed by the right side of the roughage processing apparatus 100. The left side of the roughage processing apparatus 100 may include the left platform 110, left chains 111, left driving mechanisms 101 and 103, left drums 106, left cutting mechanism 107, left platform gearbox 123, and left platform motor 125. The right side of the roughage processing apparatus 100 may include the right platform 109, right chains 112, right driving mechanisms 102 and 104, right drums 108, right cutting mechanism 115, right platform gearbox 124, and right platform motor 126.

In a further example with respect to the left side of the roughage processing apparatus 100, roughage type A may be positioned on the left platform 110 and may be moved by the left chains 111 towards the left cutting mechanism 107. The left cutting mechanism 107 may cut, chop, or otherwise process, by knives, flails, and/or other mechanisms that are positioned on left drums 106, resulting in processed roughage type A. In an embodiment, the left drums 106 may be driven or powered by or through left motor and/or mechanism 103 (e.g., chains, gears, transmissions, and/or other mechanical or other mechanism), which may be powered or driven by left motor and/or mechanism 101 (e.g., motors, further chains, gears, transmissions, and/or other mechanical or other mechanism). In combination, the left mechanisms 101 and 103 may operate to vary and control the output speed, velocity, and/or power sent through the left mechanism 103 to control the left drums 106. In an embodiment, the left chains 111 may be driven at a speed that complements the speed of the left drums 106 (e.g., and complements the cutting speed of the left cutting mechanism 107).

With respect to the right side of the roughage processing apparatus 100, roughage type B may be positioned on the right platform 109 and may be moved by the right chains or conveyor 112 towards the right cutting mechanism 115. The right cutting mechanism 115 may cut, chop, or otherwise process, by knives, flails, and/or other mechanisms that are positioned on right drums 108, resulting in processed roughage type B. In an embodiment, the right drums 108 may be driven or powered by or through right mechanism 104 (e.g., chains, gears, transmissions, and/or other mechanical or other mechanism), which may be powered or driven by right mechanism 102 (e.g., motors, further chains, gears, transmissions, and/or other mechanical or other mechanism). In combination, the right mechanisms 102 and 104 may operate to vary and control the output speed, velocity, and/or power sent through the right mechanism 104 to control the right drums 108. In an embodiment, the right chains 112 may be driven at a speed that complements the speed of the right drums 108 (e.g., and complements the cutting speed of the right cutting mechanism 115).

In an embodiment, the left side and the right side of the roughage processing apparatus 100 may be operated independently and concurrently. In an embodiment, the left side and the right side may be driven at different speeds (e.g., the left chains 111 are driven at a different speed than the right chains 112, and the left drums 106 are driven at a different speed than the right drums 108). In such an arrangement, the left side and the right side may be used for cutting different types of roughages at desirable respective speeds for the types of roughages (e.g., roughage type A and roughage type B) concurrently.

Therefore, the speed, velocity, or power of left mechanism 101 and the speed, velocity, or power output of right mechanism 102 may be independently controlled, allowing for simultaneous control of the speed, velocity, or power delivered to left drums 106 by or through left mechanism 103 to left cutting, chopping, or processing mechanisms 107, which can be significantly different than the speed, velocity, or power delivered to right cutting, chopping, or processing device 115 positioned on right drums 108 by or through right mechanism 102/104. The independent control allows the operator to cut, chop or process type A roughage, positioned on left floor chains 111 residing on and supported by left platform 110 and powered by left gear box or mechanism 123 which is powered or driven by left motor or mechanism 125, significantly different than type B roughage, positioned on right floor chains 112 which is residing on and supported by right platform 109 and powered by right gear box or mechanism 124, which is powered or driven by right motor or mechanism 126. This allows the operator to cut, chop or process roughage type A positioned on left floor chain 111 residing on left platform 110 to an efficient and/or desirable particle size, while simultaneously cutting, chopping, or processing roughage type B positioned on right floor chain 112 residing on right platform 109 to an efficient and/or desirable particle size concurrently, even though roughage type A that is positioned on left floor chains 111 and roughage type B that is positioned on right floor chains 112 may need substantially different amounts of cutting, chopping or processing to reach their correct particle size for the most efficient livestock utilization.

In an embodiment, discharge conveyor 121, which may be powered by discharge motor or mechanism 122, provides a mechanism of dispensing the roughage to the livestock after being cut, chopped, or processed to the proper particle size. For example, discharge conveyor 121 may be positioned at an end of the drums 106 and 108 where processed roughages (e.g., roughage type A and roughage type B after passing through the cutting mechanisms 107 and 115 and drums 106 and 108) are expected to be released from the drums 106 and 108, concurrently. The discharge conveyor 121 may be positioned to drive along the sides of the release points of the drums 106 and 108 (e.g., perpendicular to the release points of the drums 106 and 108), when driven by the discharge motor 122. As the discharge conveyor 121 is driven, the processed roughages move along on the discharge conveyor 121 (e.g., towards the side of the roughage processing apparatus 100) and may be released for collection (e.g., a feed collection bin). As the processed roughages move along the discharge conveyor 121, additional processed roughages may be further released from the drums 106 and 108 onto different locations of the discharge conveyor, thereby aiding in the mixing of the processed roughages (e.g., roughage type A and roughage type B).

In an embodiment, the left platform 110 and the right platform 109 may be formed from an integrated piece of platform or may be separate platforms.

In an embodiment, the roughage processing apparatus 100 may include one or more additional sets of platforms, chains, driving mechanisms, drums, cutting mechanisms, platform gearboxes, and platform motors. These additional sets may be positioned in parallel orientation with the right and left sets and may be driven at different speeds for the processing of additional types of roughages. In an embodiment, the discharge conveyor 121 may be used to move the discharge from these additional sets.

Figure 2A:
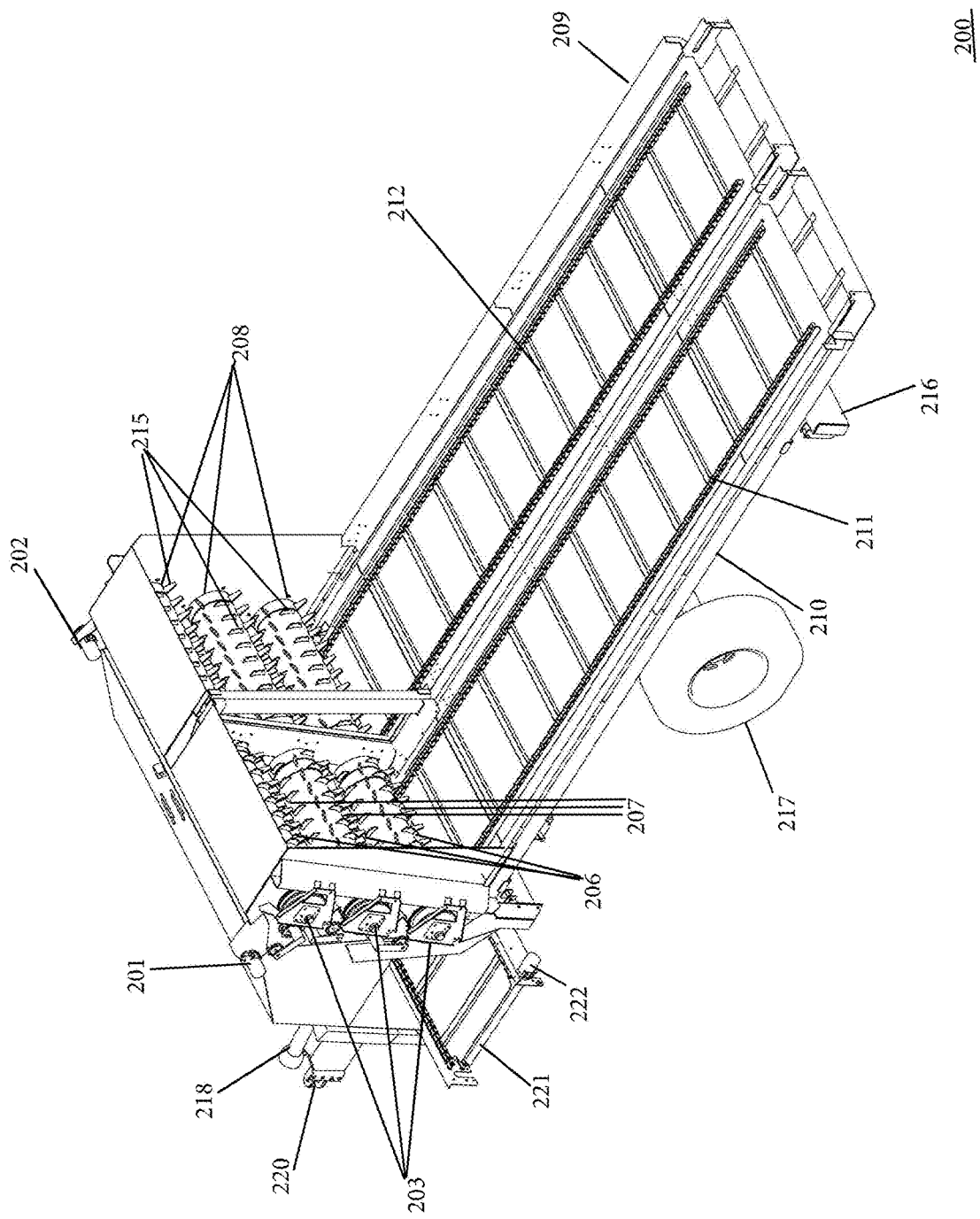
Figure 2C:
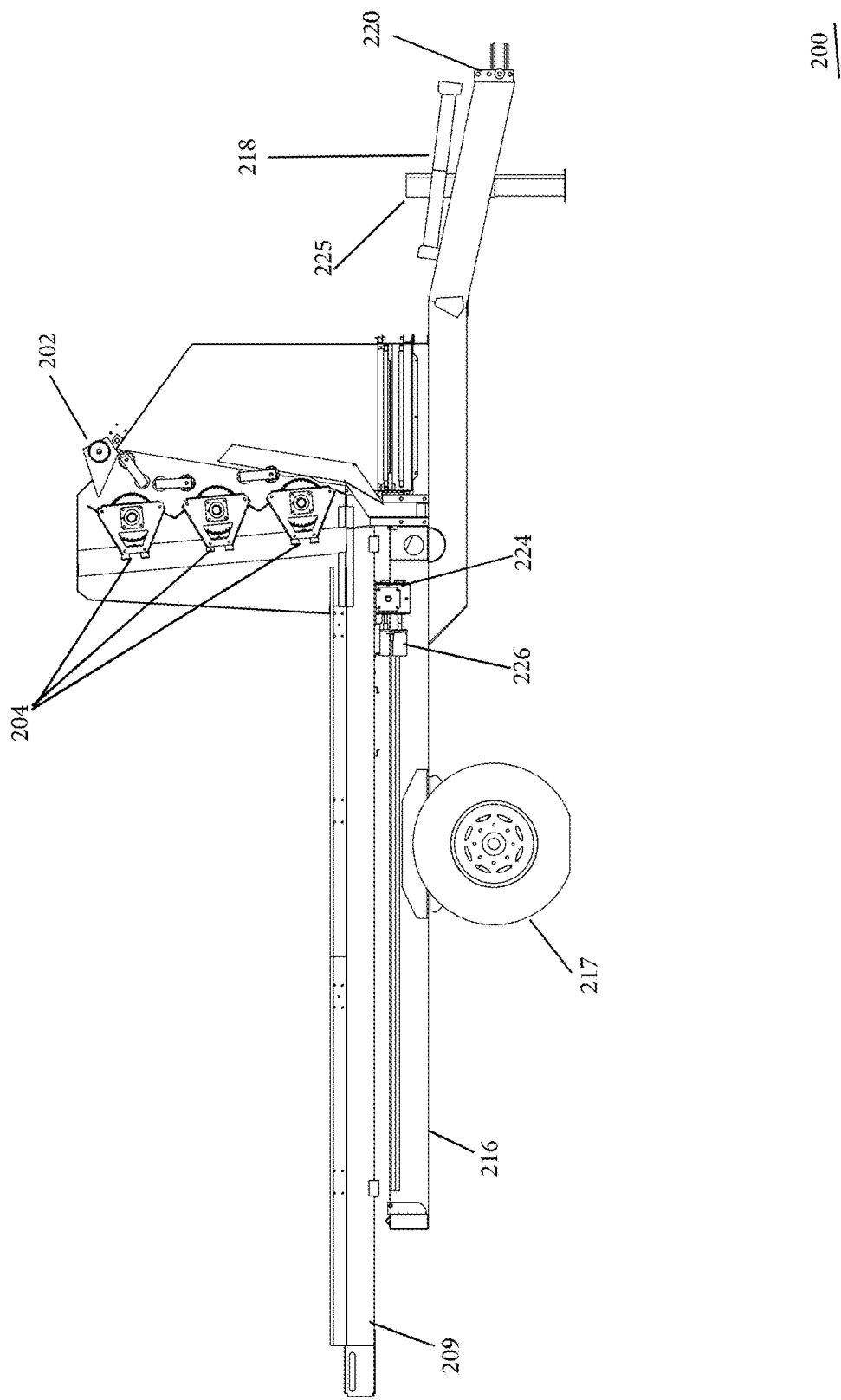
Figure 2D:
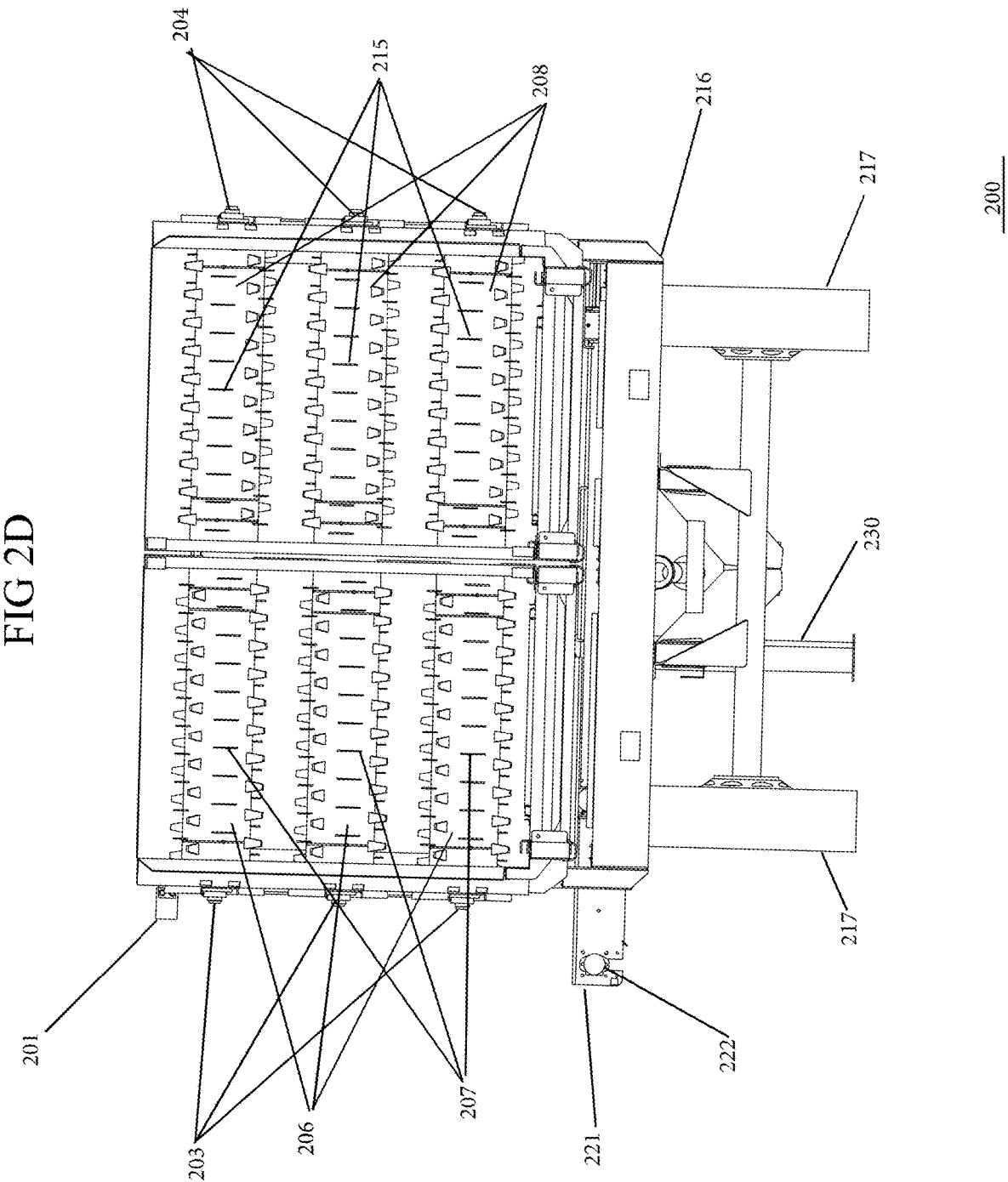

FIGS. 2A-2D illustrate views of an exemplary apparatus for roughage processing according to an embodiment; FIG. 2A illustrates a perspective view of the apparatus; FIG. 2B illustrates a left side view of the apparatus; FIG. 2C illustrates a right side view of the apparatus; and FIG. 2D illustrates a back view of the apparatus.

Referring to FIGS. 2A-2D, roughage processing apparatus 200 may be mounted on or form the frame or bed of a trailer according to an embodiment.

In an embodiment, roughage processing apparatus 200 may include trailer 216, hoses and/or wirings 218, hitch 220, support 230, wheels 217, left platform 210, right platform 209, left chains or conveyor 211, right chains or conveyor 212, left driving mechanisms 201 and 203, right driving mechanisms 202 and 204, left drums 206, right drums 208, left cutting mechanisms 207, right cutting mechanisms 215, left platform gearbox 223, right platform gearbox 224, left platform motor 225, right platform motor 226, discharge conveyor 221, and discharge conveyor motor 222.

In an embodiment, roughages of different types (e.g., two different types of roughages) may be processed by the two sides of roughage processing apparatus 200. For example, roughage of one type (e.g., roughage type A) may be processed by the left side of the roughage processing apparatus 200, and roughage of another type (e.g., roughage type B) may be processed by the right side of the roughage processing apparatus 200. The left side of the roughage processing apparatus 200 may include the left platform 210, left chains or conveyor 211, left driving mechanisms 201 and 203, left drums 206, left cutting mechanism 207, left platform gearbox 223, and left platform motor 225. The right side of the roughage processing apparatus 200 may include the right platform 209, right chains or conveyor 112, right driving mechanisms 202 and 204, right drums 208, right cutting mechanism 215, right platform gearbox 224, and right platform motor 226.

In a further example with respect to the left side of the roughage processing apparatus 200, roughage type A may be positioned on the left platform 210 and may be driven by the left chains 211 towards the left cutting mechanism 207. The left cutting mechanism 207 may cut, chop, or otherwise process, by knives, flails, and/or other mechanisms that are positioned on left drums 206, resulting in processed roughage type A. In an embodiment, the left drums 206 may be driven or powered by or through left mechanism 203 (e.g., chains, gears, transmissions, and/or other mechanical or other mechanism), which may be powered or driven by left mechanism 201 (e.g., motors, further chains, gears, transmissions, and/or other mechanical or other mechanism). In combination, the left mechanisms 201 and 203 may operate to vary and control the output speed, velocity, and/or power sent through the left mechanism 203 to control the left drums 206. In an embodiment, the left chains 211 may be driven at a speed that complements the speed of the left drums 206 (e.g., and complements the cutting speed of the left cutting mechanism 207).

With respect to the right side of the roughage processing apparatus 200, roughage type B may be positioned on the right platform 209 and may be driven by the right chains 212 towards the right cutting mechanism 215. The right cutting mechanism 215 may cut, chop, or otherwise process, by knives, flails, and/or other mechanisms that are positioned on right drums 208, resulting in processed roughage type B. In an embodiment, the right drums 208 may be driven or powered by or through right mechanism 204 (e.g., chains, gears, transmissions, and/or other mechanical or other mechanism), which may be powered or driven by right mechanism 202 (e.g., motors, further chains, gears, transmissions, and/or other mechanical or other mechanism). In combination, the right mechanisms 202 and 204 may operate to vary and control the output speed, velocity, and/or power sent through the right mechanism 204 to control the right drums 208. In an embodiment, the right chains 212 may be driven at a speed that complements the speed of the right drums 208 (e.g., and complements the cutting speed of the right cutting mechanism 215).

In an embodiment, the left side and the right side of the roughage processing apparatus 200 may be operated independently and concurrently. In an embodiment, the left side and the right side may be driven at different speeds (e.g., the left chains 211 are driven at a different speed than the right chains 212, and the left drums 206 are driven at a different speed than the right drums 208). In such an arrangement, the left side and the right side may be used for cutting different types of roughages at desirable respective speeds for the types of roughages (e.g., roughage type A and roughage type B) concurrently.

Therefore, the speed, velocity, or power of right mechanism 201 and the speed, velocity, or power output of right mechanism 202 may be independently controlled, allowing for simultaneous control of the speed, velocity, or power delivered to left drums 206 by or through left mechanism 203 to left cutting, chopping, or processing mechanisms 207, which can be significantly different than the speed, velocity, or power delivered to left cutting, chopping, or processing device 215 positioned on left drums 208 by or through right mechanism 204. The independent control allows the operator to cut, chop or process type A roughage, positioned on left floor chains 211 residing on and supported by left platform 210 and powered by left gear box or mechanism 223 which is powered or driven by left motor or mechanism 225, significantly different than type B roughage, positioned on right floor chains 212 which is residing on and supported by right platform 209 and powered by right gear box or mechanism 224, which is powered or driven by right motor or mechanism 226. This allows the operator to cut, chop or process roughage type A positioned on left floor chain 211 residing on left platform 210 to an efficient and/or desirable particle size, while simultaneously cutting, chopping, or processing roughage type B positioned on right floor chain 212 residing on right platform 209 to an efficient and/or desirable particle size concurrently, even though roughage type A that is positioned on left floor chains 211 and roughage type B that is positioned on right floor chains 212 may need substantially different amounts of cutting, chopping or processing to reach their correct particle size for the most efficient livestock utilization.

In an embodiment, discharge conveyor 221, which may be powered by discharge motor or mechanism 222, provides a mechanism of dispensing the roughage to the livestock after being cut, chopped, or processed to the proper particle size. For example, discharge conveyor 221 may be positioned at an end of the drums 206 and 208 where processed roughages (e.g., roughage type A and roughage type B after passing through the cutting mechanisms 207 and 215 and drums 206 and 208) are expected to be released from the drums 206 and 208, concurrently. The discharge conveyor 221 may be positioned to drive along the sides of the release points of the drums 206 and 208 (e.g., perpendicular to the release points of the drums 206 and 208), when driven by the discharge motor 222. As the discharge conveyor 221 is driven, the processed roughages move along on the discharge conveyor 221 (e.g., towards the side of the roughage processing apparatus 200) and may be released for collection (e.g., a feed collection bin). As the processed roughages move along the discharge conveyor 221, additional processed roughages may be further released from the drums 206 and 208 onto different locations of the discharge conveyor, thereby aiding in the mixing of the processed roughages (e.g., roughage type A and roughage type B).

In an embodiment, the left platform 210 and the right platform 209 may be form from an integrated piece of platform or may be separate platforms.

In an embodiment, the roughage processing apparatus 200 may include one or more additional sets of platforms, chains, driving mechanisms, drums, cutting mechanisms, platform gearboxes, and platform motors. These additional sets of be positioned in parallel orientation with the right and left sets and may be driven at different speeds for the processing of additional types of roughages. In an embodiment, the discharge conveyor 221 may be used to move the discharge from these additional sets.

In an embodiment, hoses, driveline, or sprockets and chains and/or wirings 218 may include one or more of mechanism of conveying mechanical or electrical power to the roughage processing apparatus 200 (e.g., from the vehicle or other machine that is towing the roughage processing apparatus 200). For example, the hoses, driveline and/or wirings 218 may transfer mechanical, hydraulic, electrical and/or a combination of these and other mechanisms to power the roughage processing apparatus 200. The hitch 220 may be used to connect and tow the roughage processing apparatus 200 by the vehicle or other machine. The support 230 (e.g., a stand) may be deployed to support the roughage processing apparatus 200 when independent or further support is needed (e.g., when the roughage processing apparatus 200 is not in tow).

Figure 3:
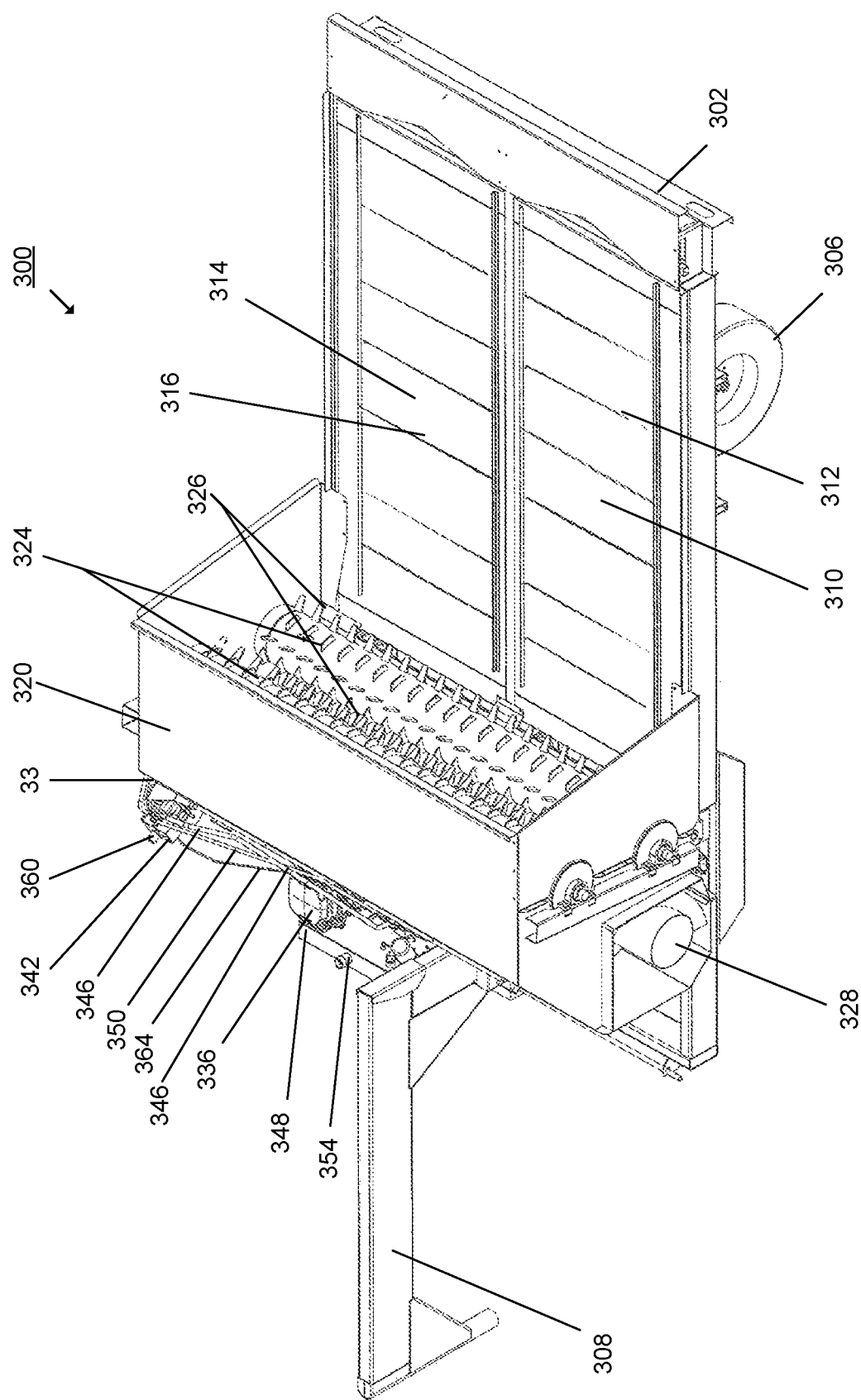
FIG. 3 illustrates a top perspective view of the exemplary apparatus of FIG. 3.
Figure 4:
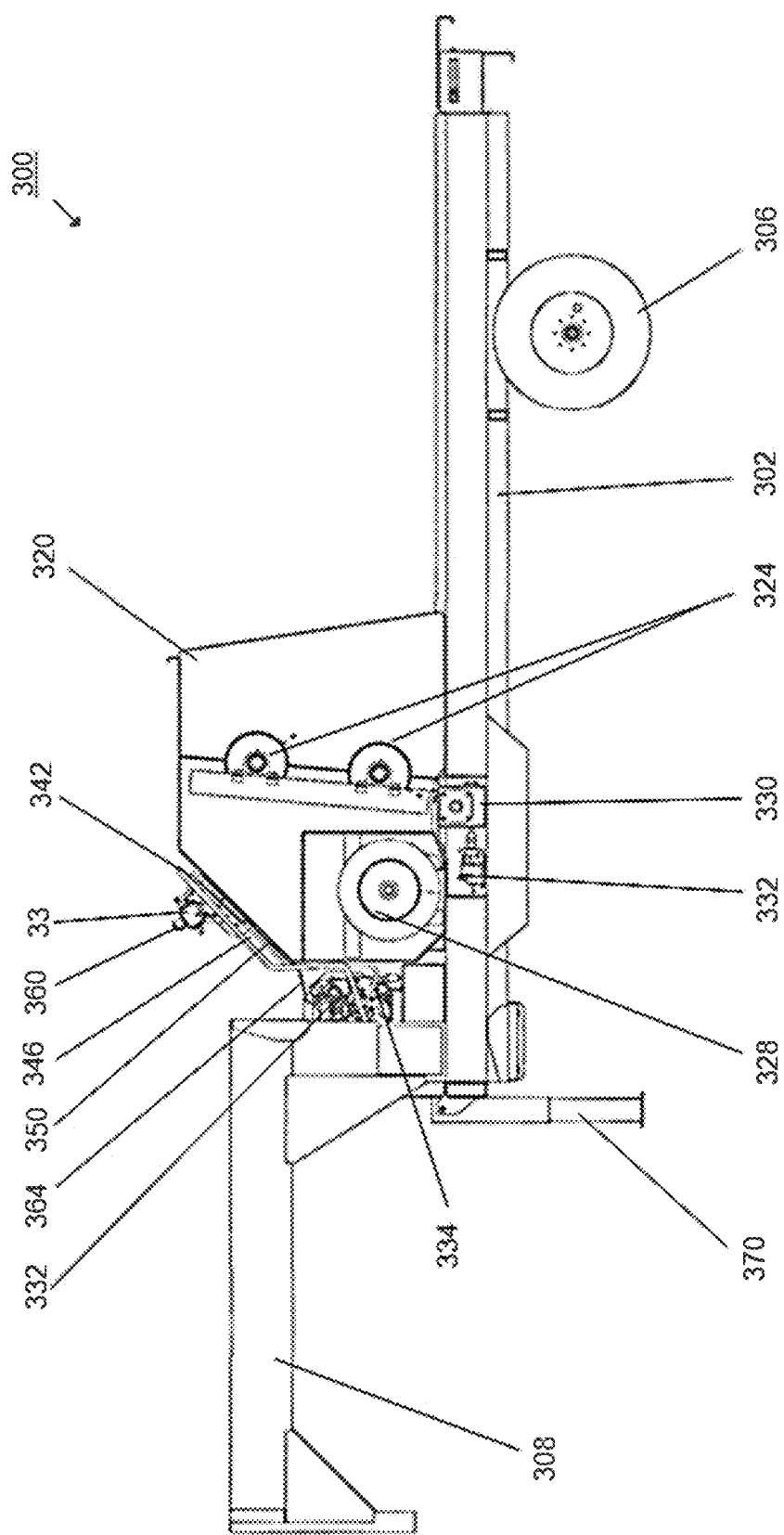
FIG. 4 illustrates a left side view of an exemplary apparatus of FIG. 3.
Figure 5:
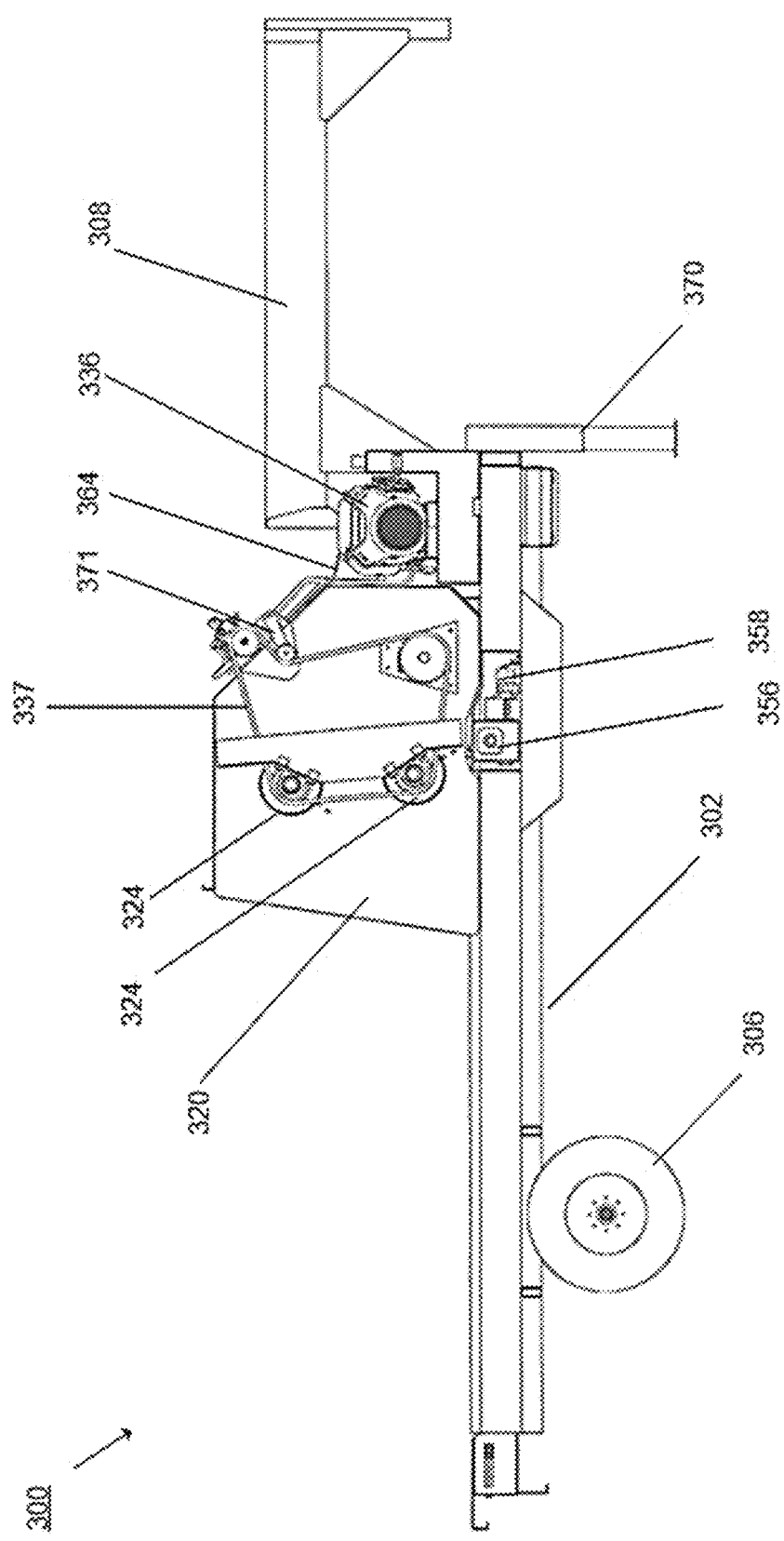
FIG. 5 illustrates a right side view of the exemplary apparatus of FIG. 3.
Figure 6:
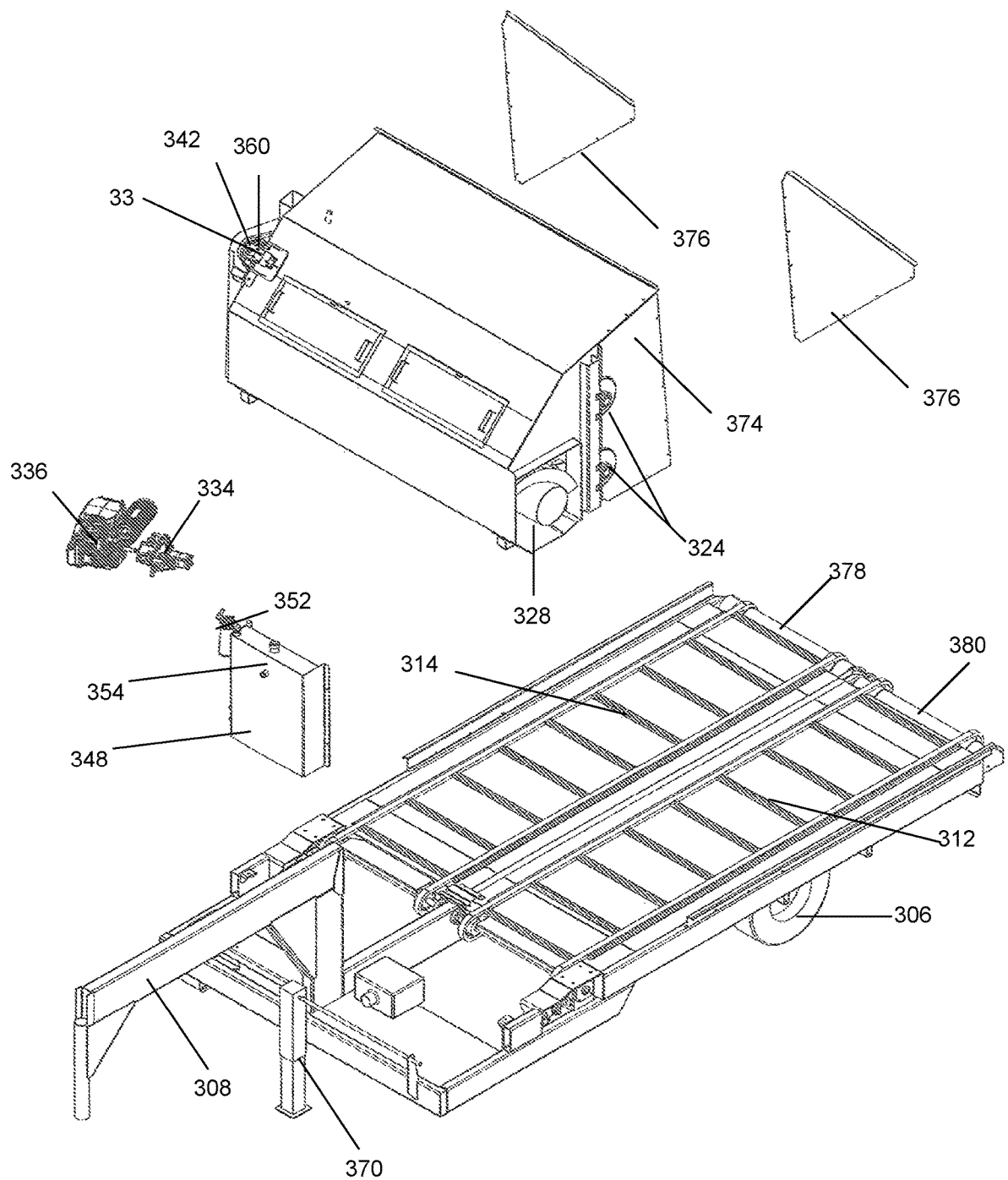
FIG. 6 illustrates an exploded dissembled view of at least a portion of the exemplary apparatus of FIG. 3.
Figure 7:
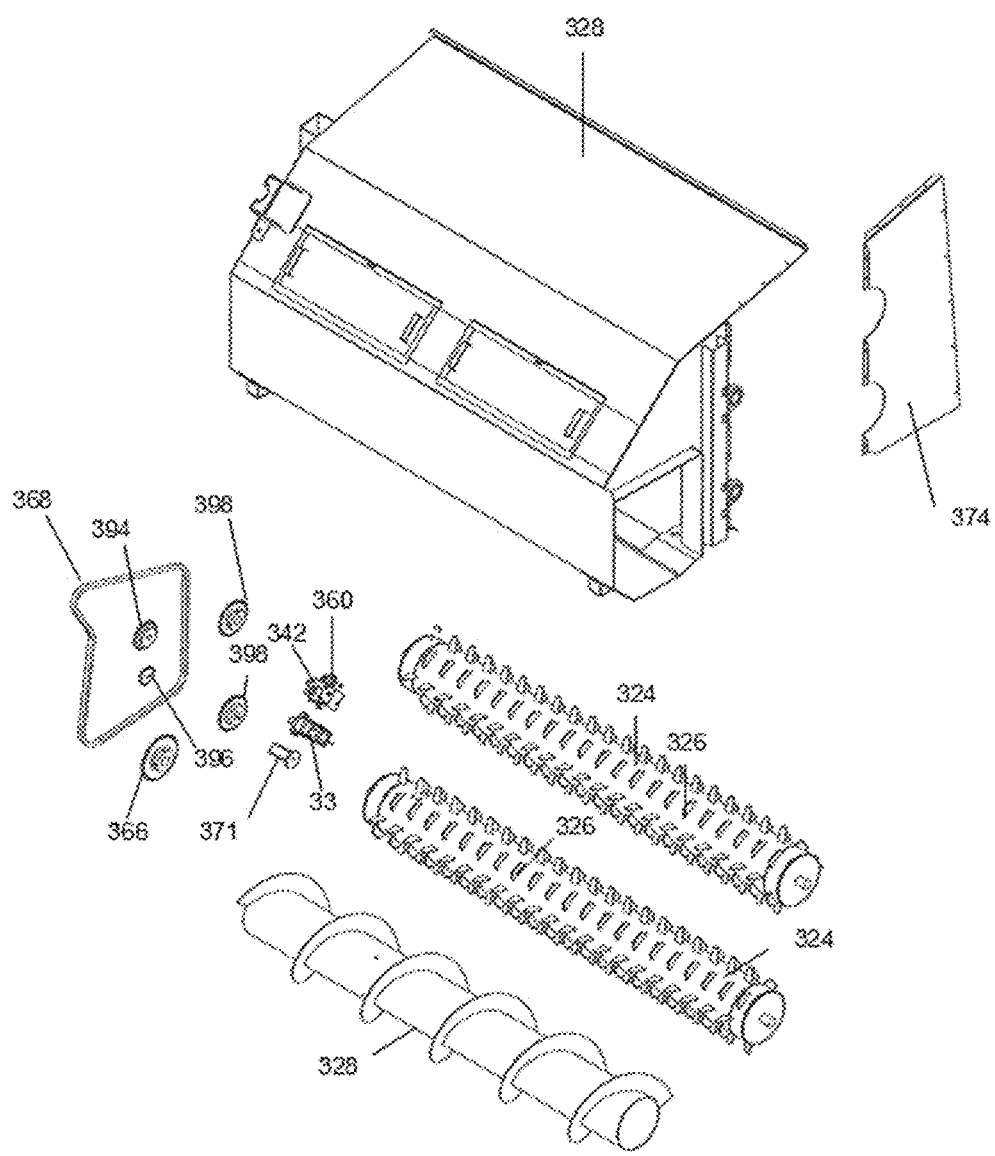
FIG. 7 illustrates an exploded dissembled view of at least a portion of the exemplary apparatus of FIG. 3.
Figure 8:
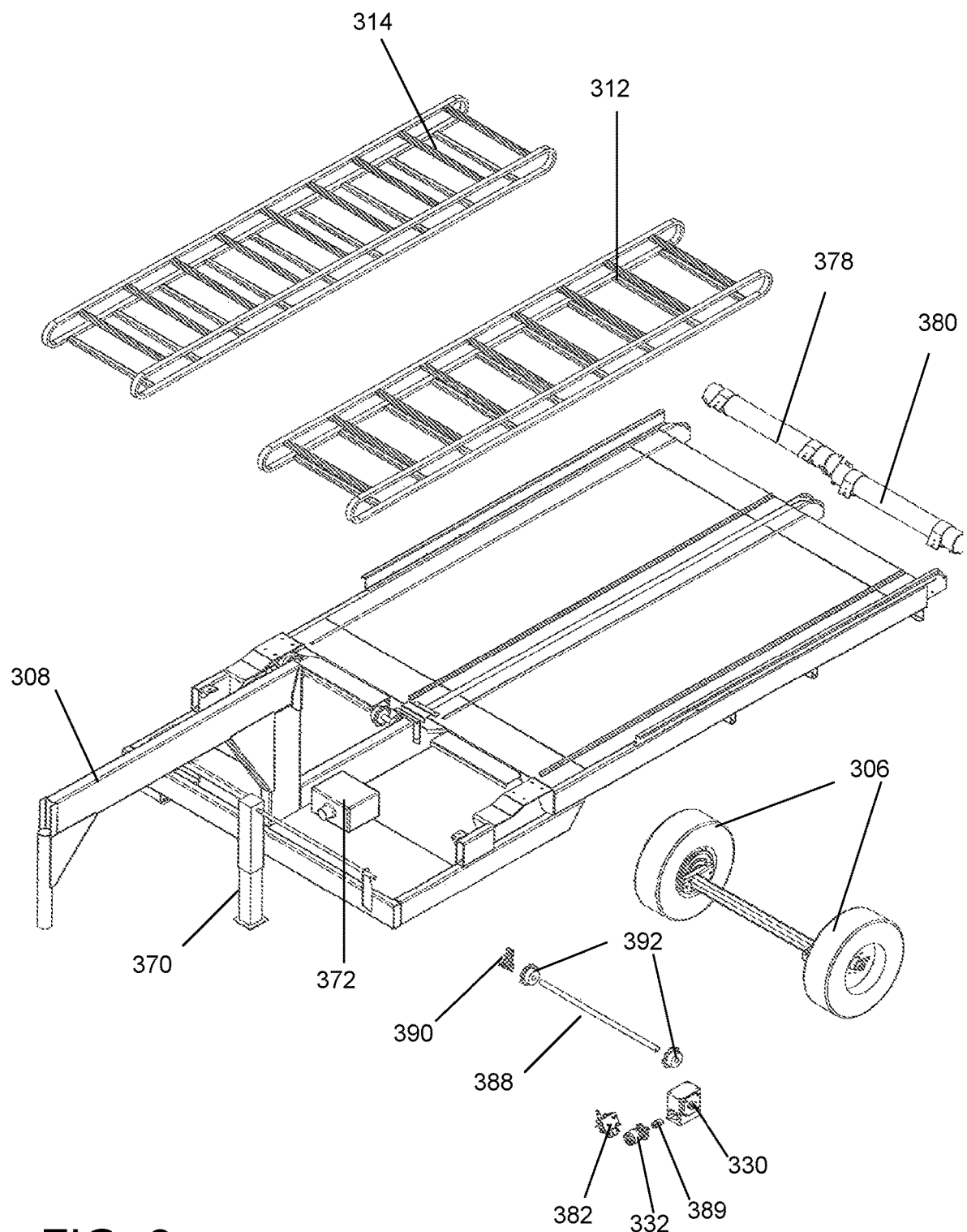
FIG. 8 illustrates an exploded dissembled view of at least a portion of the exemplary apparatus of FIG. 3.

FIG. 3 illustrates a top perspective view of the exemplary apparatus of FIG. 3. FIG. 4 illustrates a left side view of an exemplary apparatus of FIG. 3. FIG. 5 illustrates a right side view of the exemplary apparatus of FIG. 3. FIG. 6 illustrates an exploded dissembled view of at least a portion of the exemplary apparatus of FIG. 3. FIG. 7 illustrates an exploded dissembled view of at least a portion of the exemplary apparatus of FIG. 3. FIG. 8 illustrates an exploded dissembled view of at least a portion of the exemplary apparatus of FIG. 3.

Referring to FIGS. 3-8, a roughage processing apparatus 300 may include a trailer or other movable portion 302 that the processing apparatus is mounted or arranged onto. The trailer may be an autonomous vehicle, e.g., a self powered autonomous vehicle. The trailer 302 includes wheels 306 and an optional hitch assembly 308. In this embodiment, the hitch assembly 308 is a fifth wheel hitch assembly configured to be coupled to a pickup or other vehicle, however, any type of conventional hitch assembly may be utilized as known in the art. The apparatus 300 further includes a left platform 310 with left chains or conveyor 312, and a right platform 316 with right chains or conveyor 314. The left platform 310 and the right platform 314 are configured to operate at the same or different speeds. A protective shroud or cover 320 partially covers one or more cutting assemblies or cutting mechanisms. Each of the cutting assemblies includes a drum 324 and a plurality of knives or flails 326. An auger 328 is configured to expel the cut material on one side. Optionally and/or alternatively, the processing apparatus 300 may also be mounted on a truck or configured in a stationary orientation.

In this embodiment, different roughage types can be simultaneously processed. For example, roughage type A and roughage type B may be processed simultaneously, mixed into different ratio ratios, e.g., 1:2, 1:3, 1:4, 1:5, combinations of the same and the like. Roughage A may be positioned on left floor 310 and moved with chain or conveyor 312, e.g., the roughage A may be moved forward, backward or be stopped by a gearbox 330. The gearbox 330 is driven by hydraulic motor 332 and powered by hydraulic fluid via hoses (not shown) from hydraulic pump 334. The hydraulic pump 334 is driven or powered by small motor 336. In operation, the chain or conveyor 312 moves the roughage type A to the cutting assemblies that can cut, chop, or process the roughage A, e.g., via knives or flails 326 positioned on drums 324.

The cutting assemblies, e.g., drums 324 are driven or powered by or through belt or chain 337. The drums 324 are powered or driven by hydraulic motor 33, which is powered or driven by hydraulic fluid which passes through manifold 342. The hydraulic fluid is conveyed through hose 346 from a hydraulic pump 334. The hydraulic pump 334 is driven or powered by small motor 336. The hydraulic fluid after powering motor 33 may be returned to hydraulic tank 348 passing back through manifold 342 and then through hose 350 and passing through hydraulic filter 352 then into hydraulic tank 348. The tank 348 can be filled, e.g., with hydraulic fluid, thru filler spout 354.

Roughage type B may be positioned on the right floor chain or conveyor 316 that can move forward, backward or be stopped by gearbox 356. Gearbox 356 is driven by hydraulic motor 358 and powered by hydraulic fluid thru hoses from hydraulic pump 334. The hydraulic pump 334 is powered and driven by small motor 336. Roughage B could potentially move forward at a different rate than roughage A, thereby allowing the operator to create varying blends or ratios of roughage A and roughage B. Both roughage A and B would be cut, chopped, or processed by knives or flails 326 positioned on drums 324. The drums 324 are driven or powered by or through the belt or chain 337 that is powered or driven by hydraulic motor 33. The hydraulic motor 33 is powered or driven by hydraulic fluid which passes through manifold 342 and is conveyed by hose 346 from hydraulic pump 334 and driven or powered by small motor 336. The system is configured with one or more pressure sensors 360 that is configured to continuously monitor the hydraulic pressure and/or changes in the hydraulic pressure and configured to keep the pressure of the hydraulic fluid powering motor 332, motor 358 and motor 33 in a predetermined range.

The one or more pressure sensors 360 can be housed in manifold 342 or elsewhere on the apparatus. In one embodiment, the one or more pressure sensors 360 are configured to detect one or more of hydraulic pressure, changes in hydraulic pressure, excessive hydraulic pressure, e.g., in the range of 1600 psi to 2000 psi, and low hydraulic pressure. The one or more pressure sensors 360 are configured to dynamically detect the pressures in a predetermined time range 100 to 600 milliseconds or greater. The one or more pressure sensors 360 are further configured to detect the pressure and changes that are required to power or drive hydraulic motor 33. The one or more pressure sensors 360 are further configured to transmit information indicative of the pressure or change of pressure, e.g., via signal, through line 364 or other electronic means, e.g., wireless or wired. The pressure sensors 360 and/or a controller are configured to divert the flow of hydraulic fluid that is driving hydraulic motor 358 and hydraulic motor 332 when the pressure used to operate motor 33 exceeds a predetermined range. The diverted flow of hydraulic fluid is sent to the hydraulic tank 348 and this action slows and/or stops the hydraulic motor 358 moving roughage A on floor 310 and slows and/or stops the hydraulic motor 358 moving roughage B on floor 316. In such case, more pressure is now available for motor 33 thereby allowing an increase in power and operational capabilities, e.g., torque, rpm and the like.

The system is further configured to detect with the pressure sensor 360 a lesser amount of hydraulic pressure going to the hydraulic motor 33, e.g., in the range of 1200 psi to 1550 psi for a predetermined time, e.g., a span of 100 to 600 milliseconds. When the system via the pressure sensor 360 detects the lesser amount of hydraulic pressure the system is configured to redirect the hydraulic pressure from the tank 348 to hydraulic motor 332 and hydraulic motor 358, thereby starting movement of the chains 312 and 314. In a preferred embodiment, the pressure sensor 360 sends a signal through line 364 or other electronic means, e.g., wireless or wired, to hydraulic motor 332 and hydraulic motor 358, thereby restarting the movement of both roughage A on floor 310 and roughage B on floor 316 into the knife drums 324 to continue processing or chopping the roughage in the predetermined ratio.

The pressure sensor 360 is configured to continuously monitor the hydraulic pressure and configured to keep the pressure of the hydraulic fluid powering motor 332, motor 358 and motor 33 in a predetermined range. In a preferred embodiment, the predetermined range is between 1200 psi and 1800 psi, and in a more preferred embodiment the range is between 1200 psi and 1400 psi. In operation, when the hydraulic pressure of the hydraulic fluid powering motor 33 which drives or powers knife drums 324 drops to 1600 psi or less it indicates that motor 33 has overcome the excessive force being exerted on the knife drums 324, and it has regained the necessary speed and torque to start chopping or processing roughage again.

When the left floor chain 312 and the right floor chain 314 stop moving the roughage into the knife drums 324 it minimizes or eliminates any additional force being put on the knife drums 324 and as each of the floor chains 312 and 314 were stopped when the knife drums 324 were still turning, the knife drums 324 are able to continue processing, e.g., chopping the roughage A and roughage B. Eventually, the knife drums 324 can catch up and the existing force on the knife drums 324 is decreased. With less force being exerted on the knife drums 324 they will quickly regain speed, power, and torque.

In one embodiment, controlling the starting and stopping of the floor chains 312 and 316 as roughages A and B are fed, respectively, into the knife drums 324 controls and/or limits the amount of roughages that are fed into knife drums 324. This control over a period of time allows control over the force and work exerted by the motor 33 and the motor 336 driving the system, up to the work limits of motors 33 and 336. In this embodiment, it reduces or prevents stalls or stoppages in the motors 33 and 336 due to the motors 33 and 336 needing to cut heavier loads of roughages and having to work over their limits. Optionally and/or alternatively, a controller is configured to control motors 33 and 336 more efficiently by feeding in roughages loads up to the power limits of motors 33 and 336. In one embodiment, the controller is configured to speed up the floor chains 312 and 316 to move in more roughage when motors 33 and 336 are able to cut a heavier load. In one embodiment, the motors 33 and 336 may be of a small horsepower, e.g., about 100 hp or less. In one embodiment, motors 33 and 336 may be 10 hp or more. In an embodiment, bales of 800-900 lbs to 1500-1800 lbs (of approximately 8 ft in length) may be fed into the knife drum 324 at about 2 ft/min using a 20 hp motors 33 and 336.

Discharge conveyor or auger 328 provides for dispensing the roughage to the livestock after being cut or chopped. The auger 328 is turned or powered by sprocket 366 which is turned or powered by belt or chain 368 and kept tight by tensioner 371. Belt or chain 368 is turned and/or powered by motor 33, which is powered or driven by small motor 336. Sprocket 394 is positioned on hydraulic motor 33 and drives chain 368 which then turns sprockets 398 which are positioned on the end of knife drums 324, thus turning knife drums 324. Sprocket 396 is an idler sprocket which is attached to tensioner 371 and keeps the slack out of chain 368.

Jack stand 370 provides support for trailer 302 when not attached to a vehicle for towing. Towing attachment or hitch 308 is used to attach trailer 302 to a vehicle allowing the apparatus to be towed. Fuel tank 372 is used to supply fuel to small motor 336. Hydraulic tank 348 contains hydraulic fluid and depicts one possible way of conveying power produced by small motor 336 to driven mechanism or motor 33 and driven mechanism or motor 332 and driven mechanism or motor 358. The use of hydraulic fluid and hydraulic pumps and hoses is only one possible way of conveying drive power from small motor 336. Optionally and/or alternatively, hydraulics can be replaced or supplemented with mechanical mechanisms such as chains, drivelines, gearboxes, transmissions, or any other mechanism or combination of mechanisms that allows the operator to convey the drive power produced by small motor 336 to driven mechanism or motor 33 and driven mechanism or motor 332 and driven mechanism or motor 358.

In one embodiment, a detachable knife housing piece 374 is configured to at least partially cover the drums 324. Knife hood extensions 376 are configured to keep roughage from falling off the side. Adjustable mechanisms 378 and 380 are configured to tighten floor chains 312 and 314.

Manifold 382 is positioned on hydraulic motor 332 and allows for the controlling of the hydraulic fluid that drives hydraulic motor 332 (starting, stopping, varying the speed, or reversing it). Hydraulic motor 332 is connected to right angle gearbox 330 by connector 389. Right angle gearbox 330 is also connected to head shaft 388, which is supported on the other end by pillow block bearing 390. Sprockets 392 are positioned on head shaft 388, e.g., these sprockets are configured to fit in the links on one or more floor chains used to move it forward (or backward).

The system 300 allows for varying the speed, velocity, or power of left mechanism 312 and the speed, velocity, or power output of right mechanism 314 independently of one another, allowing for simultaneous control of the speed, velocity, or power with which the roughages on each mechanism are delivered to drums 324 for cutting, chopping, or processing. The independent control allows the operator to cut, chop or process type A roughage, positioned on left floor chains 312 residing on and supported by left platform 310 and powered by left gear box or mechanism which is powered or driven by the left motor or mechanism, at a significantly different speed, velocity, or power than the type B roughage, positioned on right floor chains 314 which is residing on and supported by right platform 316 and powered by right gear box or mechanism, which is powered or driven by right motor or mechanism. This allows the operator to cut, chop or process roughage type A positioned on the left floor chain residing on left platform to an efficient and/or desirable particle size, while simultaneously cutting, chopping, or processing roughage type B positioned on right floor chain residing on right platform to an efficient and/or desirable particle size, even though roughage type A that is positioned on left floor chains 312 and roughage type B that is positioned on right floor chains 314 may need substantially different amounts of cutting, chopping or processing to reach their correct particle size for the most efficient livestock utilization. Moreover, the independent control allows for different mixing ratios of roughage type A and roughage type B, e.g., 1:2, 1:3. 1:4 or any combination.

In an embodiment, a roughage processing apparatus may be stationary (e.g., mounted and/or fixed on a platform or ground and/or incorporated as a part of another machine (e.g., part of a process chain)) instead of movable as incorporated into a truck or other vehicles or on a trailer. In a further embodiment, a roughage processing apparatus could utilize an electrical or other power source (e.g., through power cables) or may include its own power source (e.g., incorporated onto the unit itself).

In an embodiment, the mechanism used to chop the roughage may also have several different configurations depending on the mechanism used to cut, chop, or processes the roughage. For example, there could be one large drum with knives or flails for each roughage being cut, chopped, or processed; or there could be several different smaller drums or beater bars; or a combination of knives and flails and round or square tubes used to support the knives, flails, or other mechanism of cutting, chopping, or processing the roughage. The system could also incorporate a cutter bar for the knives, flails, or the cutting, chopping, or processing mechanism to pass through.

The cutting, chopping, or processing devices could be powered or driven by many different mechanisms, from belts and pulleys to chains and sprockets, to hydraulic motors, to direct drivelines and gears. In varying configurations, the mechanism powering the cutting, chopping, or processing mechanism speed, velocity or power may be controlled independently of the second set of cutting, chopping or processing devices. The ability to independently vary and control the speed, velocity, or power of two different cutting, chopping, or processing devices positioned in close proximity to each other, simultaneously, lets the operator vary the cut, chop, or processing of two different types of roughage being moved into each of the cutting, chopping, or processing devices. The mechanism to vary the speed, velocity, or power of the cutting, chopping, or processing devices can also have many different configurations. The mechanism could be hydraulically driven and vary the speed, velocity, and power by changing the hydraulic flow and pressure, or it could be mechanically driven with the speed, velocity, and power able to be changed by a transmission type gearbox, or various combinations of mechanical and hydraulic mechanisms.

When the operator has the ability to vary the cut, chop, or processing amount for two or more different types of roughage being cut, chopped, or processed simultaneously, he can maximize the efficiency of both roughages simultaneously, even though each requires a radically different cut, chop, or processing to meet its particular optimum particle size for the class of livestock being fed.

In operation, in an embodiment, the producer or operator may have two separate mechanisms of cutting, chopping, or processing two different types of roughages. The two separate mechanisms may have individual controls that will allow the producer or operator to adjust the cut or chop of the roughage to obtain the optimum cut or chop to provide for maximum efficiency of each roughage being blended in the ration, even when the two different roughages require radically different amounts of cutting, chopping, or processing to reach their optimum particle size for maximum efficiency.

An additional advantage of having separate cutting, chopping, or processing devices for each of the different roughages being cut, chopped, or processed is to have the mechanisms of chopping attached and supported by the same platform supporting the roughage. In an embodiment, the platform could be further supported by weight scales (e.g., weigh cells), or other mechanism that provides a manner of determining weight, providing a more accurate weight of the roughage being cut, chopped, or processed into the ration being blended and fed to the livestock.

It is noted that if the mechanism for cutting, chopping, or processing the roughage is not supported on the same platform as the roughage, the cutting or chopping process may lift the roughage (e.g., through an application of force by the chopping mechanism on the roughage), which may transfer at least a portion of the weight of the roughage to the support and/or other mechanisms supporting the cutting or chopping mechanism. Therefore, if substantially all of the weight of the roughage residing on the platform is not supported by the platform and thus by the weigh cells supporting it, there may be an effect on the accuracy of the weight being indicated by the weigh cells. It is further noted that if the mechanism for cutting, chopping, or processing the roughage is not supported on the same platform as the roughage, the cutting or chopping process may exert downward pressure on the roughage (e.g., through an application of force by the chopping mechanism on the roughage), which may also have an effect on the accuracy of the weight being indicated by the weigh cells. In such situations, the operator may need to halt the cutting, chopping, or processing and let the cutting, chopping, or processing device spin free of the roughage to obtain an accurate weight. When the cutting, chopping, or processing mechanism that is cutting, chopping, or processing the roughage is 100% supported by the same platform supporting the roughage, all of which is supported by weigh cells, a consistent accurate weight is obtainable without having to stop and allow the cutting, chopping, or processing device to spin free from the roughage to eliminate any deflection, supporting, or lifting of the roughage. If the operator does not need to halt the cutting, chopping, or processing to obtain an accurate weight, benefits may include reduced time and increased accuracy of the weight being obtained.

When the cutting, chopping, or processing mechanism is supported on the same platform supporting the roughage which is supported by weigh cells, this eliminates the possibility for the cutting or chopping process to cause a deflection and thus an inaccurate scale reading. It therefore creates moment to moment consistent accuracy of the scale system throughout the whole cutting or chopping process while in motion. In an embodiment, with a moment to moment, in motion, accurate reading throughout the cutting and chopping process, it may determine accurately and/or precisely the weight (e.g., how many pounds) of roughage being cut, chopped or processed. For example, one may use the right and left platforms for each increment of forward movement of the right and left floor chains while still in motion for the determination. This may allow for quicker (e.g., substantially real-time) corrections of incorrect blends, increasing efficiency and reducing time that may be lost to stopping the device to weigh the roughages.

In another possible embodiment, the speed of movement of each side of the floor (e.g., controlling the right and left floor chains with a computer for further accuracy, efficiency, automation, and other benefits). For example, a computer program may be used to calculate the necessary floor speed of each side and the correct knife speed of each side, to create the desired blend and particle size of the roughages on each side to meet the nutritional needs of the livestock being fed. The computer program may store and use known or pre-determined feed blends (e.g., particle sizes of the output feed blend for a particular type of livestock, based on age, sex, and/or other factors) based on known information to calculate the control parameters (e.g., speed of the floor chains, speed of knives, and/or other parameter) that generate the resulting feed blend with the apparatus.

In an embodiment, the computer program may also receive data from sensors that monitor various conditions (e.g., moisture, roughage sizes, particle sizes of the resulting feed blend) and use such reading from the sensors as an active feedback to further control and/or fine tune the control parameters. In an additional embodiment, the computer program may use machine learning and/or other techniques to further automate and fine tune the control.

In an embodiment, the computer program may further incorporate the ground speed and length of bunks to be filled, along with the roughage particle size desired, the amount of each different type of roughage to be fed per head of livestock, the number of livestock to be fed, and/or other factors to further increase consistency and efficiency. For example, if we are able to acquire an accurate in-motion roughage weight for the amount of roughage which is being cut, chopped, or processed off of the platform and onto the discharge conveyor at a given floor chain speed, all of the other parameters for automations can be acquired or calculated, which in turn creates the possibility for automation, in varying degrees and at different or even all points in the process.

Further possibilities/embodiments may include the option for the computer controls to be programed to start the various functions of the apparatus in a certain order and in a ramp up fashion to allow for less wear and tear on the machine, requiring less horsepower during start up, and provide a more constant blending of feed sources. The computer could also have sensor feedback built into the system that would depict when problems are about to happen by detecting excessive pressure being required to run the knives indicating they are about to stall out and so the computer can stop or slow down the floors in order to avoid a problem such as jams or breakage of components.

Another possible embodiment might have warnings show on the control screen if a problem with one of the systems is about to happen or has happened allowing the operator to make adjustments to fix or avoid the problem.

The present disclosure, in various aspects, embodiments, and/or configurations, includes components, methods, processes, systems and/or apparatuses substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A roughage processing apparatus, comprising:
   a motor having a horsepower below 50 horsepower;
   a left cutting mechanism comprising one or more drums;
   a right cutting mechanism comprising one or more drums,
   wherein the left cutting mechanism and the right cutting mechanism are configured to operate at different rotational speeds and the left cutting mechanism is powered with a left hydraulic motor and the right cutting mechanism is powered with a right hydraulic motor and the left hydraulic motor and the right hydraulic motor are configured to operate in a predetermined hydraulic pressure range;
   a left platform configured to receive one or more types of roughage;
   a left chain configured to move the one or more types of roughage to the left cutting mechanism and powered by a left chain hydraulic motor;
   a right platform configured to receive the one or more types of roughage;
   a right chain configured to move the one or more types of roughage to the right cutting mechanism and powered by a right chain hydraulic motor;
   one or more sensors for sensing a hydraulic pressure of one of the left hydraulic motor and the right hydraulic motor; and
   a controller for controlling the hydraulic pressure to the one of the left chain hydraulic motor and the right chain hydraulic motor, the controller is configured to stop or reduce a power to one of the left chain hydraulic motor and the right chain hydraulic motor when a sensed hydraulic pressure of one of the left hydraulic motor and the right hydraulic motor exceeds a predetermined pressure; and
   a conveyor for concurrently collecting the one or more types of roughage.

2. The roughage processing apparatus of claim 1, wherein the roughage processing apparatus is capable of being is arranged on a movable trailer.

3. The roughage processing apparatus of claim 1, wherein the predetermined pressure is above 1800 psi.

4. The roughage processing apparatus of claim 1, wherein the left cutting mechanism comprises a plurality of sharp edges disposed on the one or more drums and the right cutting mechanism comprises a plurality of sharp edges dispose on the one or more drums.

5. The roughage processing apparatus of claim 4, wherein the one or more drums of the left cutting mechanism comprises two drums and the one or more drums of the right cutting mechanism comprises two drums.

6. The roughage processing apparatus of claim 1, wherein the conveyor is configured to move the one or more types of roughage after processing away from the roughage processing apparatus.

7. The roughage processing apparatus of claim 1, further comprising one or more weight scales on one or more of the left platform and the right platform.

8. The roughage processing apparatus of claim 1, further comprising computational equipment configured to adjust or vary one or more of a speed of the left chain and a speed of the right chain.

9. The roughage processing apparatus of claim 1, wherein the controller is further configured to start or increase power to the left chain hydraulic motor and the right chain hydraulic motor when the sensed hydraulic pressure is at a second predetermined pressure.

10. The roughage processing apparatus of claim 9, wherein the second predetermined pressure is a pressure below 1600 psi.

11. The roughage processing apparatus of claim 1, wherein the one or more sensors comprises a pressure sensor configured to measure hydraulic pressure in a range from 1200 psi to 1800 psi.

12. The roughage processing apparatus of claim 1, wherein the one or more sensors comprises one or more pressure.

13. The roughage processing apparatus of claim 1, wherein the horsepower of the motor is in a range from 10 hp to 30 hp.

14. The roughage processing apparatus of claim 1, wherein the horsepower of the motor is in a range from 25 hp to 30 hp.

15. The roughage processing apparatus of claim 1, wherein the motor is a gasoline powered motor.

16. The roughage processing apparatus of claim 1, further comprising a display for displaying mixing ratios of the one or more types of roughage.

17. The roughage processing apparatus of claim 1, wherein the one or more types of roughage comprises two or more types of roughage, and
   wherein the controller is configured to adjust the left chain hydraulic motor and the right chain hydraulic motor to achieve mixing ratios of the two or more types of roughage.

18. The roughage processing apparatus of claim 17, wherein the mixing ratios comprise one or more of a 2:1 ratio, 3:1 ratio, 4:1 ratio, 5:1 ratio and combinations thereof.

19. A roughage processing apparatus, comprising:
   a motor;
   a right cutting mechanism comprising one or more drums;
   a left cutting mechanism comprising one or more drums,
   wherein the left cutting mechanism and the right cutting mechanism are configured to operate at different rotational speeds and are powered with a hydraulic motor configured to operate in a predetermined hydraulic pressure range;
   a right platform configured to receive a first type of roughage;

a right mechanism configured to move the first type of roughage to the right cutting mechanism;

a left platform configured to receive a second type of roughage, wherein the second type of roughage is different from the first type of roughage;

a left mechanism configured to move the second type of roughage to the left cutting mechanism;

one or more sensors for sensing a hydraulic pressure of the hydraulic motor;

a controller configured to control the left mechanism and the right mechanism, wherein the controller is configured to stop or reduce a power to the left mechanism and the right mechanism when a sensed hydraulic pressure exceeds a predetermined pressure.

20. The roughage processing apparatus of claim 19, wherein the roughage processing apparatus is capable of being arranged on a movable trailer.

21. The roughage processing apparatus of claim 19, wherein the predetermined pressure is in a range from 1200 psi to 1800 psi or greater.

22. The roughage processing apparatus of claim 19, wherein the left cutting mechanism comprises a plurality of sharp edges disposed on the one or more drums and the right cutting mechanism comprises a plurality of sharp edges disposed on the one or more drums.

23. The roughage processing apparatus of claim 19, wherein the one or more drums of the left cutting mechanism comprises two drums and the one or more drums of the right cutting mechanism comprises two drums.

24. The roughage processing apparatus of claim 19, further comprising a conveyor for collecting the first type of roughage and the second type of roughage that has been processed.

25. The roughage processing apparatus of claim 19, wherein the one or more sensors comprises one or more pressure sensors.

26. The roughage processing apparatus of claim 19, further comprising one or more weight scales on one or more of the left platform and the right platform.

27. A portable roughage processing apparatus, comprising:

a motor;

a left cutting mechanism comprising one or more drums;

a right cutting mechanism comprising one or more drums, wherein the left cutting mechanism and the right cutting mechanism are configured to operate at different rotational speeds and are powered with a hydraulic motor and the hydraulic motor is configured to operate in a predetermined hydraulic pressure range;

a left area on the portable roughage processing apparatus configured to receive a first type of roughage;

a left mechanism configured to move the first type of roughage to the left cutting mechanism;

a right area on the portable roughage processing apparatus configured to receive a second type of roughage, wherein the second type of roughage is different from the first type of roughage;

a right mechanism configured to move the second type of roughage to the right cutting mechanism meh;

one or more pressure sensors configured to measure a hydraulic pressure of the hydraulic motor;

a controller for controlling the hydraulic pressure of the hydraulic motor and for controlling the left mechanism and the right mechanism, the controller is configured to stop or reduce a power to one or more of the left mechanism and the right mechanism when a measured hydraulic pressure exceeds a predetermined pressure; and a conveyor for concurrently collecting the first type of roughage and the second type of roughage after respective processing by the left cutting mechanism and the right cutting mechanism.

28. The portable roughage processing apparatus of claim 27, wherein the portable roughage processing apparatus is capable of being arranged on a movable trailer.

29. The portable roughage processing apparatus of claim 27, wherein the predetermined pressure is in a range from 1200 psi to 1800 psi.

30. The portable roughage processing apparatus of claim 27, wherein the left cutting mechanism comprises sharp edges disposed on the one or more drums and the right cutting mechanism comprises sharp edges disposed on the one or more drums.

31. The portable roughage processing apparatus of claim 27, further comprising a conveyor for collecting the first type of roughage and the second type of roughage that has been processed.

32. The portable roughage processing apparatus of claim 27, further comprising one or more weight scales on one or more of the left area and the right area.

33. The portable roughage processing apparatus of claim 27, wherein the one or more pressure sensors is configured to measure changes in hydraulic pressure in 500 milliseconds or less.

* * * * *